US012522010B2

(12) United States Patent
Yoda et al.

(10) Patent No.: US 12,522,010 B2
(45) Date of Patent: Jan. 13, 2026

(54) PRINTING DEVICE

(71) Applicant: SEIKO EPSON CORPORATION, Tokyo (JP)

(72) Inventors: Jun Yoda, Shiojiri (JP); Hisayuki Akahane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 18/065,306

(22) Filed: Dec. 13, 2022

(65) Prior Publication Data

US 2023/0191813 A1 Jun. 22, 2023

(30) Foreign Application Priority Data

Dec. 16, 2021 (JP) ................................ 2021-204530

(51) Int. Cl.

| | |
|---|---|
| ***B41J 29/13*** | (2006.01) |
| ***B41J 2/175*** | (2006.01) |
| ***B41J 29/38*** | (2006.01) |

(52) U.S. Cl.

CPC ........... *B41J 29/13* (2013.01); *B41J 2/17523* (2013.01); *B41J 29/38* (2013.01)

(58) Field of Classification Search

CPC ......... B41J 2/17523; B41J 29/13; B41J 29/38

See application file for complete search history.

(56) References Cited

U.S. PATENT DOCUMENTS

| | | | | |
|---|---|---|---|---|
| 7,905,482 | B2 | 3/2011 | Matsumoto | |
| 9,352,924 | B2 * | 5/2016 | Hori | B41J 29/02 |
| 2008/0048387 | A1 | 2/2008 | Matsumoto | |
| 2020/0238739 | A1 * | 7/2020 | Arakawa | B41J 25/006 |

FOREIGN PATENT DOCUMENTS

| | | | | |
|---|---|---|---|---|
| JP | 2005133755 | * | 5/2005 | |
| JP | 2007-119172 A | | 5/2007 | |
| JP | 2007161370 A | * | 6/2007 | |
| JP | 2008-050079 | | 3/2008 | |
| JP | 2010006608 A | * | 1/2010 | B41J 29/02 |
| JP | 2021-169169 | | 10/2021 | |

* cited by examiner

*Primary Examiner* — Christopher E Mahoney
*Assistant Examiner* — Marissa Ferguson-Samreth
(74) *Attorney, Agent, or Firm* — WORKMAN NYDEGGER

(57) ABSTRACT

A printing device 1 includes an openable cover automatic opening mechanism 3, wherein the automatic opening mechanism has a lever 11 configured to be rotated and to release maintenance of the closed state of the openable cover 5 by receiving power of the carriage 15. The openable cover receives a force F in an opening direction, and the printing device 1 has a braking mechanism 103 that brakes opening movement of the openable cover by contacting a proximal end 101 of the openable cover. The braking mechanism 103 includes a brake lever 107 that contacts a contacted portion 105 located at the proximal end 101 of the openable cover to apply a braking force B, a pivot fulcrum 109 configured to pivotably supports a proximal end of the brake lever, and a spring member 110 configured to generates braking force.

8 Claims, 20 Drawing Sheets

PRINTING DEVICE

The present application is based on, and claims priority from JP Application Serial Number 2021-204530, filed Dec. 16, 2021, the disclosure of which is hereby incorporated by reference herein in its entirety.

BACKGROUND

1. Technical Field

The present disclosure relates to a printing device having an openable cover automatic opening mechanism.

2. Related Art

An example of this type of printing device is described in JP-A 2007-119172. JP-A 2007-119172 describes a structure in which a rotary damper is provided on a rotation shaft of a paper discharge tray.

However, there are problems in that the structure is complicated, the arrangement is limited, and an installation space is required, which hinders miniaturization.

SUMMARY

In order to solve the above-mentioned problems, a printing device, according to the present disclosure, includes an openable cover automatic opening mechanism and a carriage that has a print head for performing printing on a medium and that moves in a direction intersecting with a transporting direction of the medium, wherein the automatic opening mechanism has a lever configured to release maintenance of a closed state of the openable cover by receiving power of the carriage, the openable cover receives a force in an opening direction, and the printing device has a braking mechanism that is brakes opening movement of the openable cover by contacting a proximal end of the openable cover.

DESCRIPTION OF EMBODIMENTS

Figure 1:
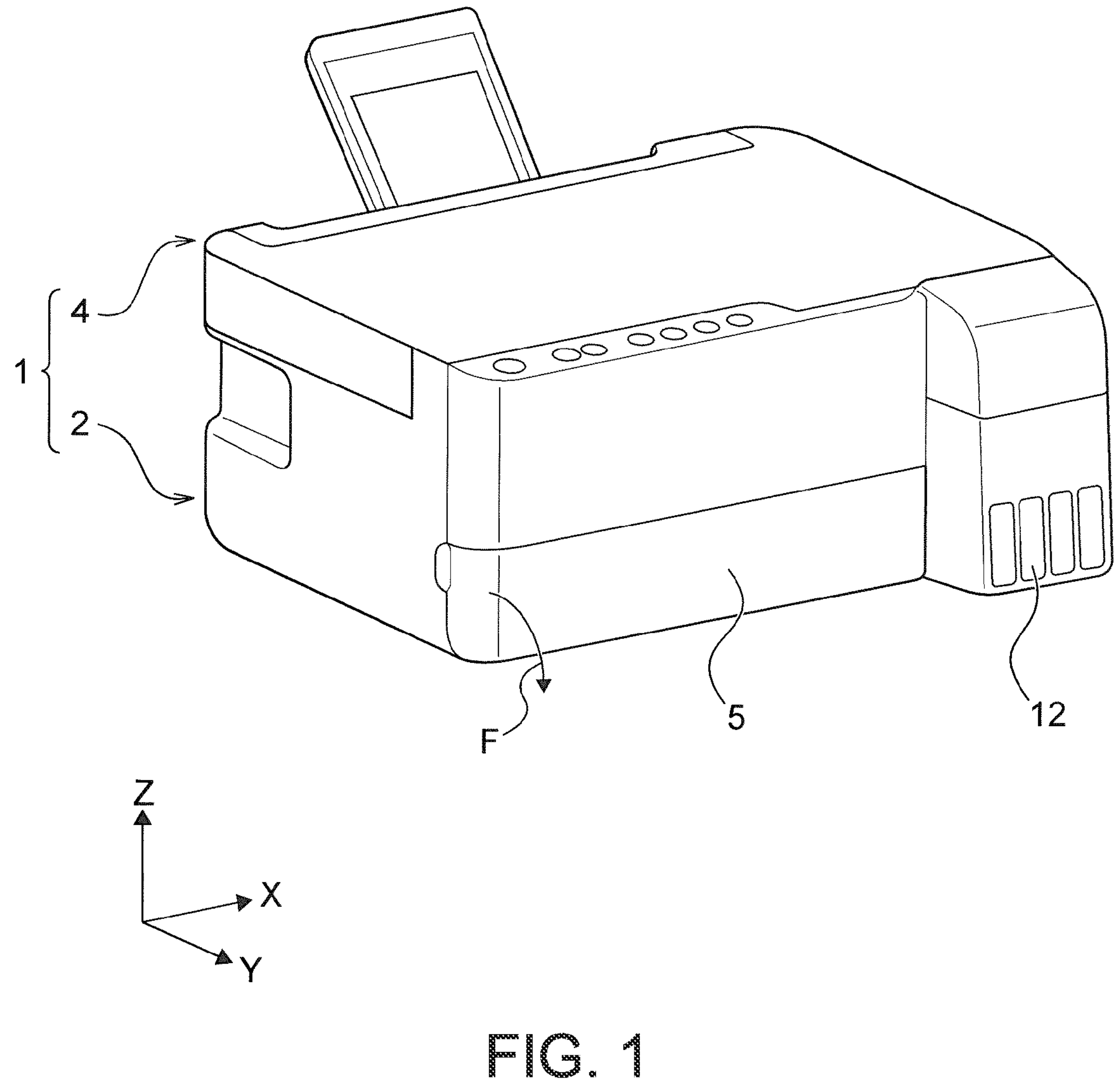
FIG. 1 is an external perspective view of a printing device according to a first embodiment.

The present disclosure will be described briefly.

In order to solve the above-mentioned problems, a printing device, according to the first embodiment of this disclosure, includes an openable cover automatic opening mechanism and a carriage that has a print head for performing printing on a medium and that moves in a direction intersecting with a transporting direction of the medium, wherein the automatic opening mechanism has a lever configured to release maintenance of a closed state of the openable cover by receiving power of the carriage, the openable cover receives a force in an opening direction, and the printing device has a braking mechanism that is brakes opening movement of the openable cover by contacting a proximal end of the openable cover.

According to this aspect, the printing device includes a braking mechanism that brakes the opening movement of the openable cover by coming into contact with the proximal end of the openable cover that is released from the closed state by the automatic opening mechanism and rotationally moves in the opening direction. As a result, the openable cover can be automatically opened by utilizing the power of the carriage. Furthermore, when the openable cover opens, the braking mechanism brakes the movement of the openable cover while it is opening, so the structure can be simplified and the rapid opening of the openable cover can be suppressed to achieve gentle opening, despite its simple structure.

A printing device according to a second aspect of this disclosure is the printing device in the first aspect, wherein the braking mechanism includes a brake lever that contacts a contacted portion located at the proximal end of the openable cover to apply a braking force, a pivot fulcrum configured to pivotably supports a proximal end of the brake lever, and a spring member configured to generates the braking force.

According to this aspect, the braking mechanism includes the brake lever that contacts a contacted portion of the openable cover to apply the braking force, the pivot fulcrum of the brake lever, and the spring member that generates the braking force. Thus, the braking mechanism for realizing the gentle opening can be realized with a simple structure.

A printing device according to a third aspect of this disclosure is the printing device in the second aspect, wherein a braking force of the braking mechanism is set to be smaller than a force in the opening direction with respect to the openable cover.

According to this aspect, the braking force of the braking mechanism is set to be smaller than the force applied to the openable cover in the opening direction. Thus, even if a braking force acts on the openable cover, it is possible to reduce the risk that the openable cover stops in the process of opening.

A printing device according to a fourth aspect of this disclosure is the printing device in the second aspect or the third aspect, wherein the contacted portion that contacts the brake lever is a cam surface, the cam surface has a shape in which a difference between an opening direction moment due to a force in the opening direction of the openable cover that is opening in the opening direction and a closing direction moment due to a braking force of the brake lever is in a constant range.

According to this aspect, the cam surface has a shape in which a difference between an opening direction moment due to a force in the opening direction of the openable cover that is opened in the opening direction and a closing direction moment due to a braking force of the brake lever is in a constant range. Thus, the speed at which the openable cover is opened can be made substantially constant.

Further, by setting the difference between the opening direction moment and the closing direction moment to be small, it is possible to open the openable cover at a slow and substantially constant speed.

A printing device according to a fifth aspect of this disclosure is the printing device in the fourth aspect, wherein the cam surface has a shape such that an angle formed by a first line segment connecting a contact point with the brake lever and the pivot fulcrum of the brake lever and a second line segment connecting the contact point with the brake lever and an opening and closing movement fulcrum of the openable cover is an obtuse angle.

According to this aspect, the cam surface has a shape such that an angle formed by the first line segment and the second line segment is an obtuse angle. By forming an obtuse angle, a moment in the closing direction is always generated with respect to the openable cover, it is possible to open the openable cover at a slow and substantially constant speed.

A printing device according to a sixth aspect of the disclosure is the printing device in any one of the second to fifth aspects further includes a sensor configured to detect the opened state and the closed state of the openable cover.

According to this aspect, a printing device includes a sensor for detecting the opened state and the closed state of the openable cover. Accordingly, the state in which the openable cover is sufficiently opened and the printing medium to be discharged is not clogged is set to be recognized as "open", so that occurrence of clogging of the printing medium can be reduced.

A printing device according to a seventh aspect of this disclosure is the printing device according to any one of the second to sixth aspects, wherein the pivot fulcrum of the brake lever is located below a power transmission mechanism that transmits power of a motor.

According to this aspect, the pivot fulcrum of the brake lever is located below a power transmission mechanism that transmits the power of the motor. Accordingly, the pivot fulcrum of the braking lever is disposed so as not to overlap with the power transmission mechanism located in the vicinity, thereby facilitating design and manufacture.

Further, when the pivot fulcrum of the brake lever is disposed so as to overlap with the power transmission mechanism in the depth direction of the device in a state where the pivot fulcrum is located below the power transmission mechanism, the size reduction in the depth direction can be realized.

A printing device according to an eighth aspect of this disclosure is the printing device in any one of the second aspect to the seventh aspect, wherein the braking mechanism is positioned outside of the transport path of a printing medium in a width direction intersecting a transport direction of the printing medium.

According to this aspect, the braking mechanism is positioned outside of the transport path of the printing medium in the width direction. This makes it possible to arrange the braking mechanism without affecting the transport of the printing medium.

A printing device according to a ninth aspect of this disclosure is the printing device in any one of the first aspect to the eighth aspect, wherein the braking mechanism is disposed so as to overlap in a depth direction with an ink supply tube that supplies ink to the print head.

According to this aspect, the braking mechanism is disposed so as to overlap the ink supply tube in the depth direction. Accordingly, an increase in the size of the printing device in the depth direction can be suppressed.

First Embodiment

Hereinafter, an openable cover automatic opening mechanism and a printing device including the same according to a first embodiment will be described in detail with reference to FIGS. 1 to 9B.

In the following description, three axes orthogonal to each other are referred to as an X-axis, a Y-axis, and a Z-axis, respectively, as shown in the drawings. The Z-axis direction corresponds to a vertical direction, that is, a direction in which gravity acts. The X-axis direction and the Y-axis direction correspond to horizontal directions. In the drawings, directions indicated by arrows of the three axes (X, Y, and Z) are positive directions of the respective directions.

Figure 2:
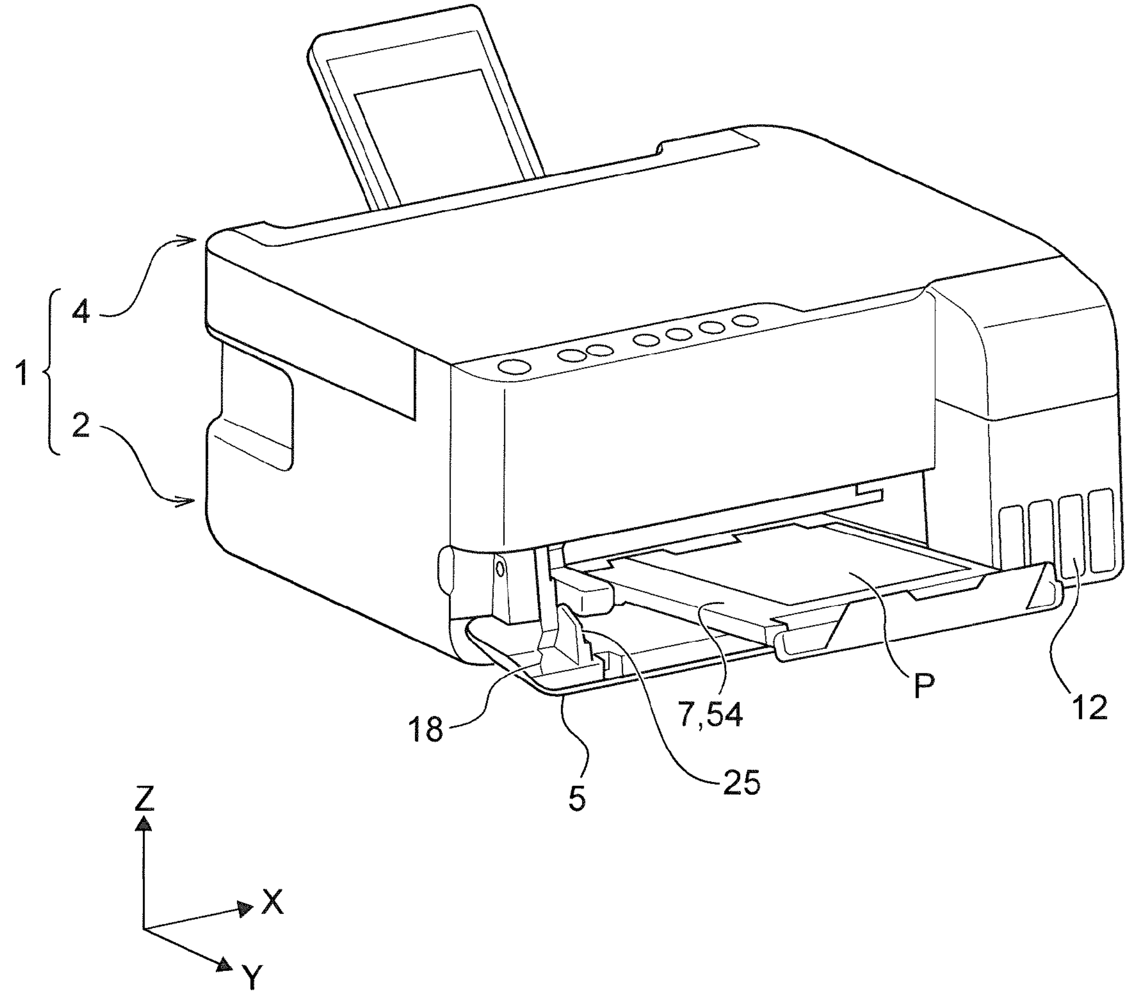
FIG. 2 is an external perspective view of a state in which an openable cover is opened in the first embodiment.
Figure 3:
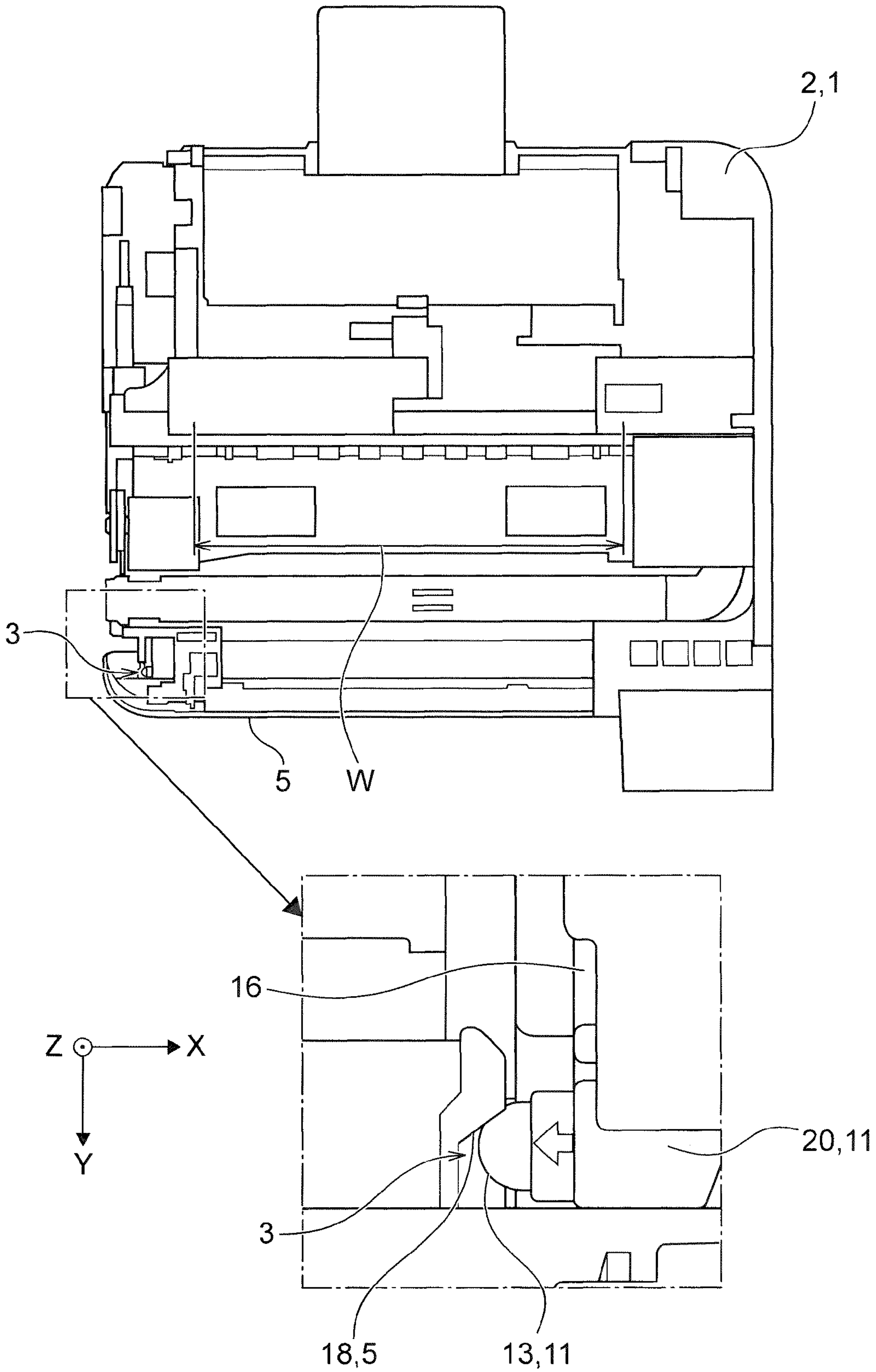
FIG. 3 is an overall plan view showing main sections inside of the first embodiment.

As shown in FIGS. 1 to 3, a printing device 1 according to the present embodiment is provided with an openable cover automatic opening mechanism 3 (FIG. 3). The printing device 1 includes a print head 65 that performs printing on medium P, and includes a carriage 15 that moves in a direction intersecting the transport direction of medium P. FIG. 2 shows a state in which an openable cover 5 located on the front side (+Y direction) of the printing device 1 is open and further shows a state in which a discharge tray 7 accommodated inside the apparatus is drawn out. The discharge tray 7 that receives a medium P (hereinafter, also referred to as "printing medium P") can be operated by opening the openable cover 5. Further, a feeding cassette (not shown) containing the printing medium may be configured to be operated.

It should be noted that the printing device 1 is a multifunction printer in which an inkjet printer 2 is located on the lower side and a scanner unit 4 is located on the upper side. The openable cover 5 is disposed at a position adjacent to an ink tank 12 of the printing device 1. The ink tank 12 can be filled with ink.

As shown in FIGS. 4 to 7, the openable cover automatic opening mechanism 3 includes a lever 11 rotatable about a rotation fulcrum 9, a locking section 13 located at one end of the lever 11 for locking the openable cover 5 in order to maintain a closed state of the openable cover 5, which, while in the closed state, is receiving a force F (FIGS. 1 and 8) in the opening direction, and a power receiving section 17 located at the other end of the lever 11 for contacting the horizontally moving carriage 15 (FIG. 7) to receive power of the carriage 15.

The lever 11 is configured to rotate when the carriage 15 comes into contact with and presses the power receiving section 17, and to release maintenance of the closed state of the openable cover 5 by the locking section 13.

Each component will be described in detail below.

Lever of Automatic Opening Mechanism

Figure 4:
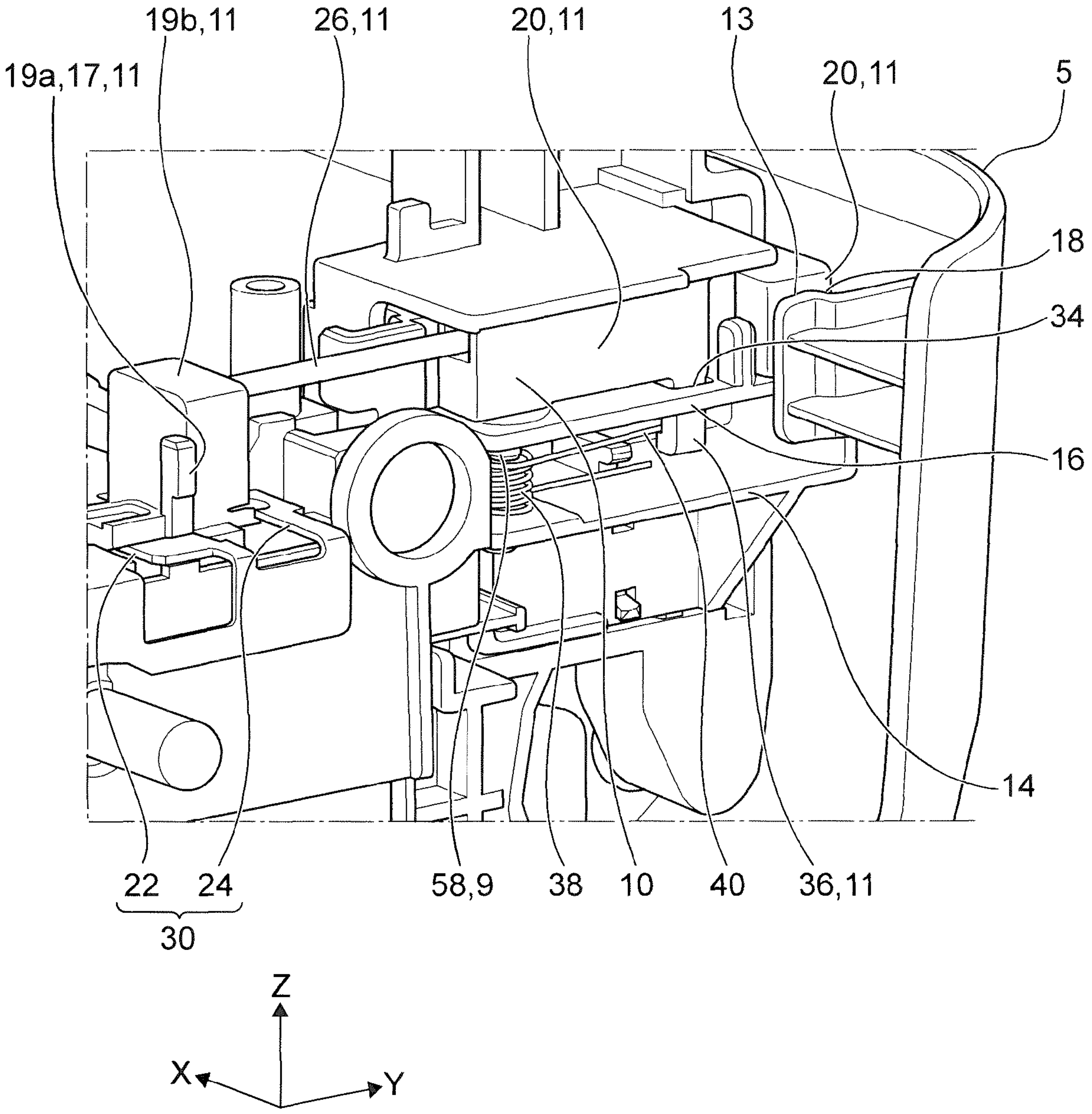
FIG. 4 is an enlarged perspective view of main sections of the first embodiment as viewed obliquely from the rear.
Figure 5:
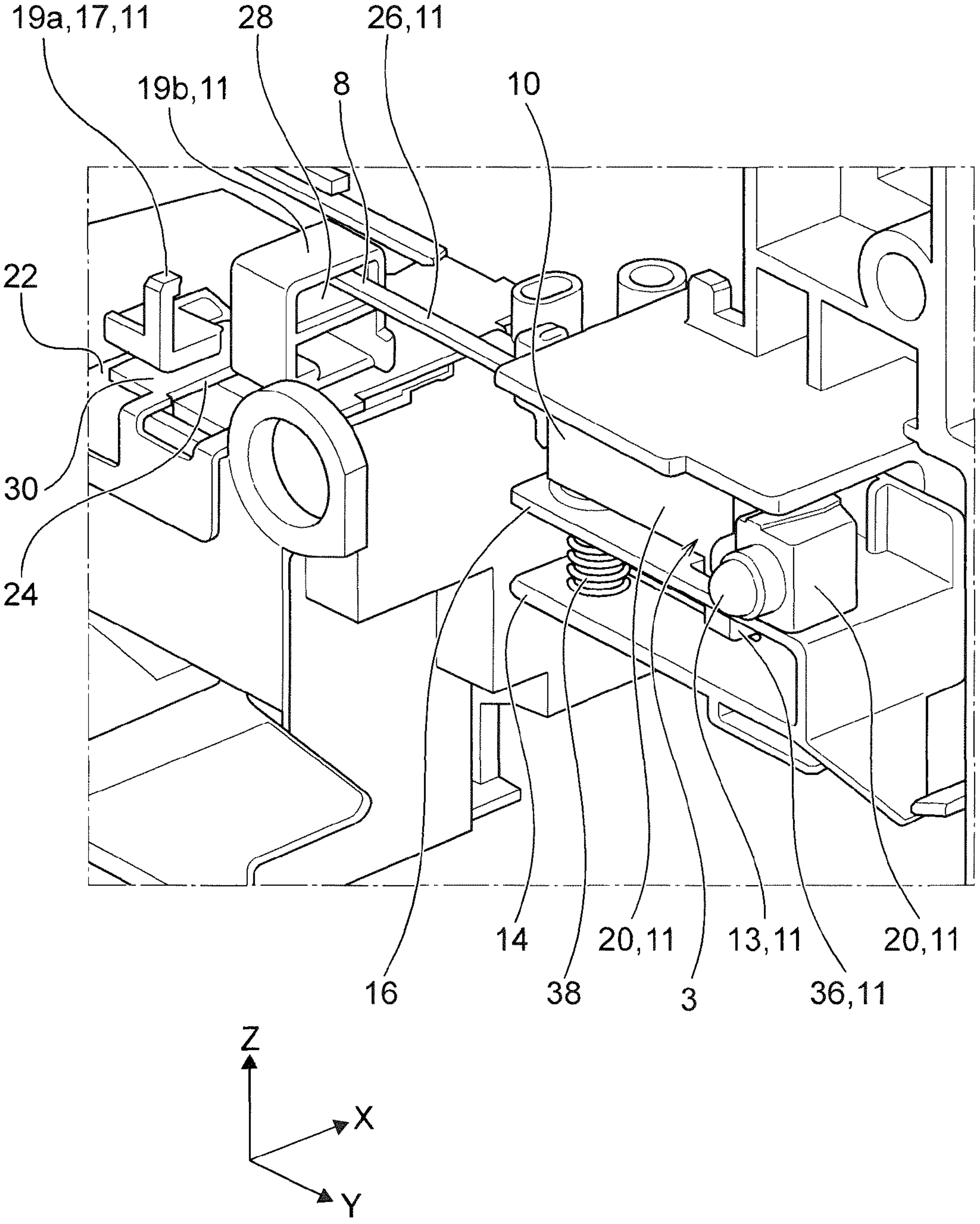
FIG. 5 is an enlarged perspective view of main sections of the first embodiment as viewed obliquely from the front.
Figure 6:
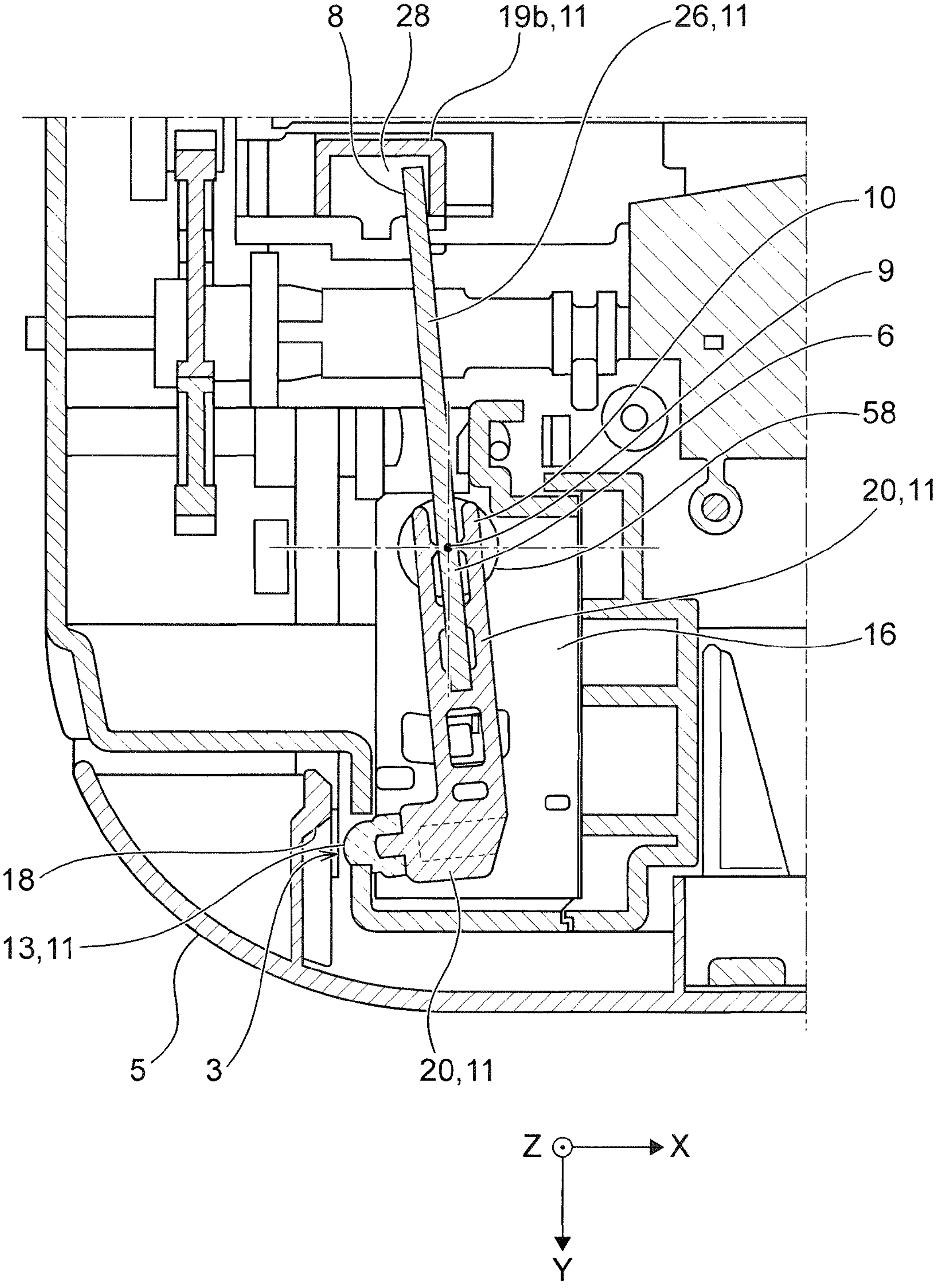
FIG. 6 is an enlarged plan view of main sections of a lever portion of the first embodiment.

In the present embodiment, as shown in FIGS. 4 to 6, the lever 11 has a shape extending in the Y-axis direction, which is a horizontal direction.

One end of the lever 11 has the locking section 13 for locking with a locked section 18 (FIGS. 2 to 4 and 6) of the openable cover 5 while in the closed state. Note that FIG. 6 shows a state in which the locking section 13 of the lever 11 is disengaged from the locked section 18 of the openable cover 5. The locking section 13 is formed in a convex curved surface shape, with the −X direction as the direction in which it protrudes, and is formed by integral molding with a resin locking section body 20, which extends in the Y-axis direction. The locking section 13 is provided on a side surface of the +Y direction tip end portion of the locking section body 20.

The power receiving section 17 for receiving the power of the moving carriage 15 is provided at the other end of the lever 11. In the present embodiment, the power receiving section 17 is constituted by a slide section 19 that slides by being pushed by the carriage 15. The slide section 19 includes two portions 19*a* and 19*b* whose bottom surfaces are guided by two guide grooves 22 and 24, respectively, (FIG. 5) in a frame 30. The two portions 19*a* and 19*b* of the slide section 19 are integrally connected to each other and integrally move in the X direction, which is the movement direction of the carriage 15.

The slide section 19*a* guided by the guide groove 22 is configured as the power receiving section 17.

In this embodiment, the slide section 19*b* guided by the guide groove 24 is connected to the locking section body 20 via a power transmission shaft 26 made of metal. One end 6 (FIG. 6) of the power transmission shaft 26 is integrally connected and fixed to the proximal end 10 of the locking section body 20, and the other end 8 is inserted into a recess 28 of the slide section 19*b* and is connected in a non-fixed state in contact with the inner surface of the recess 28.

When the integrated slide section 19*b* is moved in the −X direction by the slide section 19*a* being pushed by the carriage 15, the other end 8 of the power transmission shaft 26 moves in a state of being in contact with the inner surface of the recess 28. By this, the lever 11 can rotate with respect to the rotation fulcrum 9. That is, the linear motion of the carriage 15 in the horizontal direction is converted into the rotational motion of the lever 11 and transmitted.

Rotation Structure of the Lever of the Automatic Opening Mechanism

The lever 11 is rotatably attached in a horizontal plane on a rotation fulcrum shaft 58, which makes the rotation fulcrum 9. The rotation fulcrum 9 is constituted by the axial center of the rotation fulcrum shaft 58. In the present embodiment, the rotation fulcrum shaft 58 is fixed to a lower plate 14 and an upper plate 16, which are device structural members, oriented extending in the vertical direction.

The locking section body 20 of the lever 11 is positioned on an upper surface 32 of the upper plate 16, and a bottom part of the proximal end 10 is rotatably connected to the rotation fulcrum shaft 58. A through hole 34 (FIG. 4) is formed in the upper plate 16 near the locking section 13, and a protrusion 36 provided on the locking section body 20 is inserted into the through hole 34 in a penetrating state. The through hole 34 is formed to have a size and a shape that allow the locking section body 20 to rotate around the rotation fulcrum 9 at the proximal end 10 side.

A helical torsion spring 38 (FIG. 4) is provided between the lower plate 14 and the upper plate 16, and one end 40 of the helical torsion spring 38 is locked in the protrusion 36 of the locking section body 20. By this, the locking section body 20 is configured to receive spring force of the helical torsion spring 38 and rotate in a direction in which the locking section 13 locks to the locked section 18 of the openable cover 5.

Figure 7:
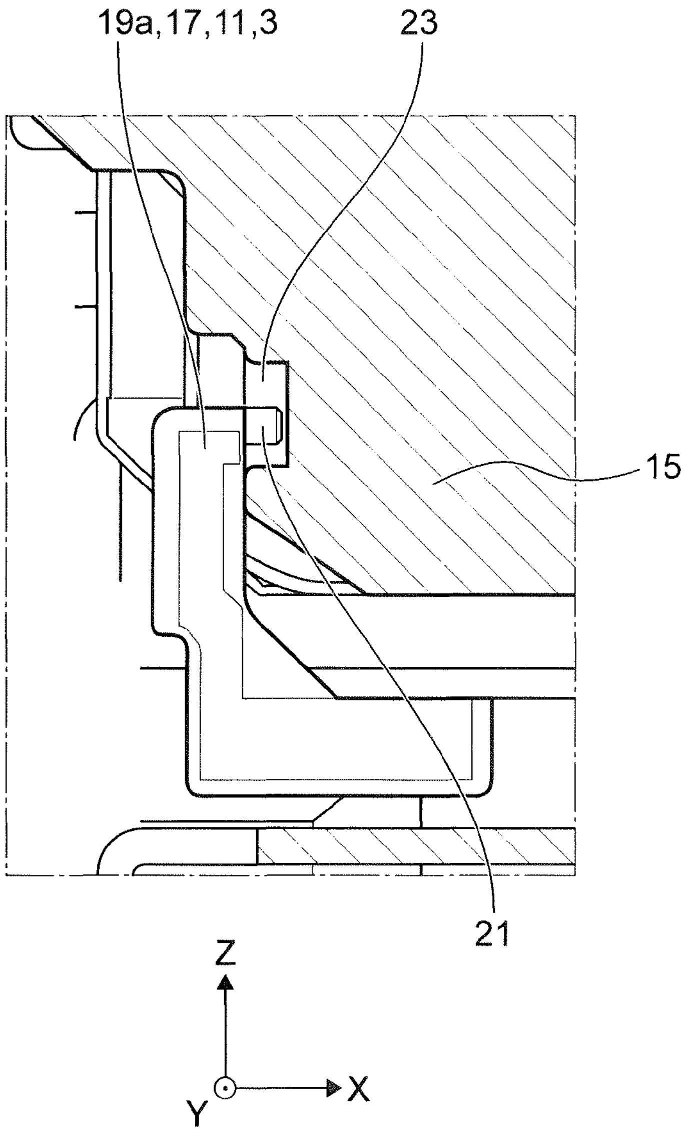
FIG. 7 is a schematic enlarged side sectional view of main sections of a power receiving section of the first embodiment.

As shown in FIG. 7, in the present embodiment, the slide section 19*a* has a contacting protrusion 21 that comes into contact with the carriage 15, and the carriage 15 is provided with a contacting recess 23 at a position that comes into contact with the contacting protrusion 21. When the slide section 19*a* of the lever 11 is pushed by the carriage 15, the contacting protrusion 21 enters the contacting recess 23, and the slide section 19*a* is easily moved integrally with the carriage 15.

Figure 8:
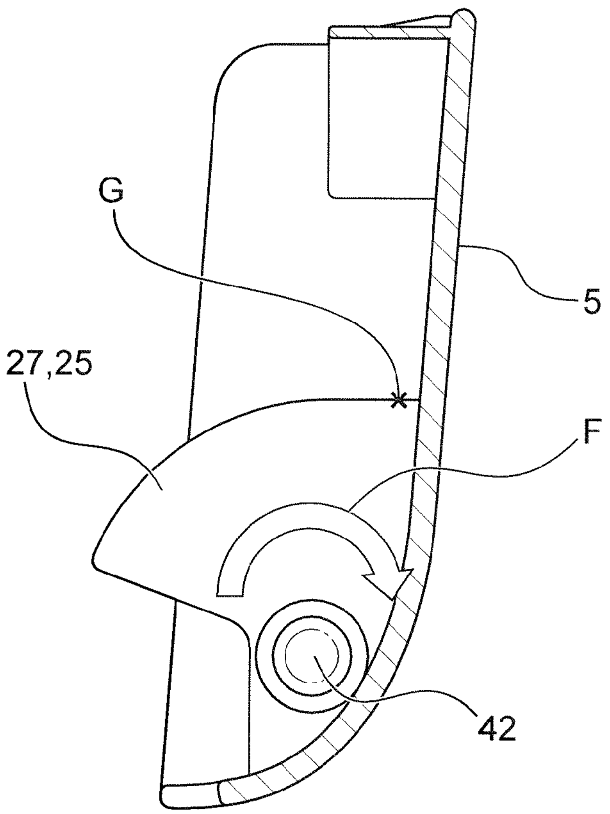
FIG. 8 is an enlarged side sectional view of the openable cover of the first embodiment.

Further, as shown in FIG. 8, in the present embodiment, the openable cover 5 is formed to have a self weight moment toward the opening side. Specifically, the position of a centroid G of the openable cover 5 is set with respect to an opening and closing movement fulcrum 42 so that the openable cover 5 opens by its own weight.

That is, since the force F in the opening direction is generated by the self weight of the openable cover 5, when the closing state of the openable cover 5 is released, the openable cover 5 opens automatically by operation of the self weight.

The force F in the opening direction is not limited to a structure using the self weight moment. For example, the force F in the opening direction may be applied using the elasticity of a spring.

Figure 9A:
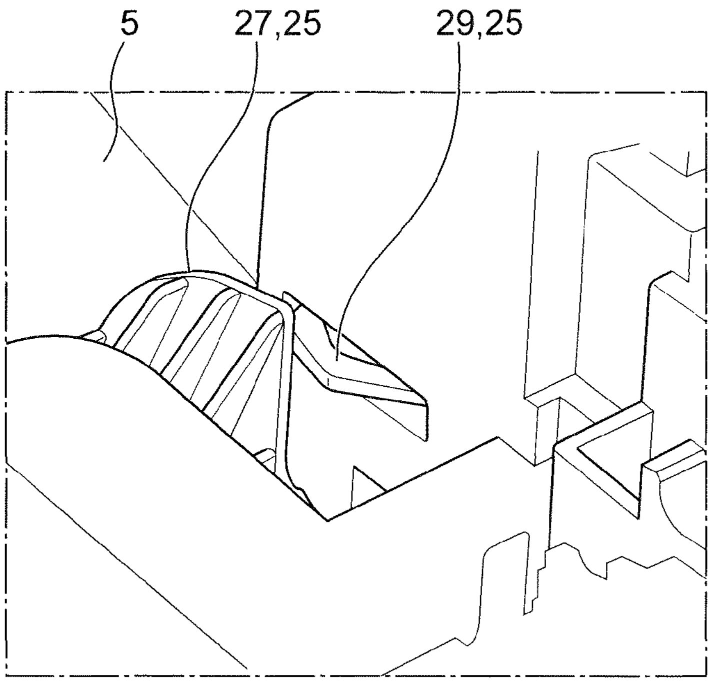
FIGS. 9A and 9B are perspective views of main sections of a sensor section according to the first embodiment.
Figure 9B:
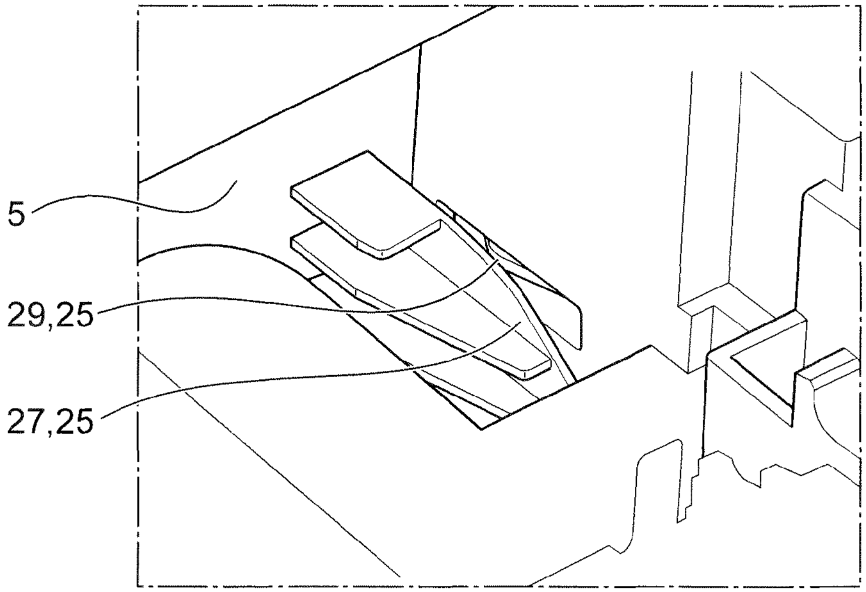

As shown in FIGS. 9A and 9B, in the present embodiment, a sensor 25 is provided for detecting an opened state and a closed state of the openable cover 5. In this case, the sensor 25 is composed of an operation piece 27 provided on the inner surface of the openable cover 5 and a detection piece 29 provided on a device structural member of the printing device 1 in a state of being pressed in the outward direction.

FIG. 9A corresponds to a state in which the detection of the sensor 25 is in an OFF state. That is, since the operation piece 27 does not push against the detection piece 29, the sensor 25 detects that the openable cover 5 is open. A range in which the sensor 25 detects that the openable cover 5 is open is set to an angle at which the discharged printing medium will not clog even if the openable cover 5 stops in the process of opening. Here, the angle is set to 70 degrees.

FIG. 9B corresponds to a state in which the detection of the sensor 25 is in an ON state. That is, since the operation piece 27 pushes against the detection piece 29, the sensor 25 detects that the openable cover 5 is closed.

In the present embodiment, the operation of releasing maintenance of the closed state of the openable cover 5 is controlled to be executed after the main switch of the printing device 1 is turned on and before a printing operation is started. The controller (not shown) is configured to execute the releasing operation as triggered by a main switch of the printing device 1 turning ON.

That is, the operation of releasing the maintenance of the closed state of the openable cover 5 is executed at an appropriate timing.

Alternatively, when the closed state of the openable cover 5 is detected, the printing operation may be stopped, and an operation of releasing the closed state of the openable cover 5 may be performed. Even if the openable cover 5 is closed during the printing operation, the openable cover 5 can be opened after the printing operation is stopped, and the printing operation can be resumed.

In addition, in the present embodiment, the carriage 15 reciprocally moves when printing is performed, and the openable cover automatic opening mechanism 3 is positioned outside the range W of the reciprocation of the carriage 15.

Specifically, as shown in FIG. 3, the openable cover automatic opening mechanism 3 is disposed outside the range W of the reciprocation of the carriage 15 when the carriage 15 performs printing. That is, the automatic opening mechanism 3 is provided in the printing device 1 so as not to influence the structure for executing the printing operation.

Restricting Movement of Carriage by Wall Member

Figure 10:
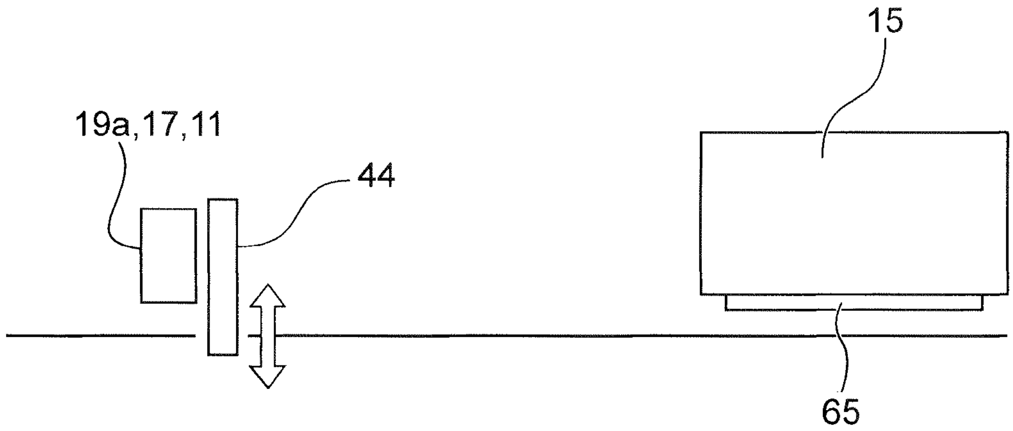
FIG. 10 is a schematic view of a structure in which a wall member is retractably provided in front of the lever of the first embodiment.

As shown in FIG. 10, in the present embodiment, a wall member 44 is provided in front of the power receiving section 17 of the lever 11, that is, in front of the slide section 19*a*, so as to be able to protrude and retract in the vertical direction. When the carriage 15 is moved to operate the automatic opening mechanism 3 to open the openable cover 5, the wall member 44 is in a retracted state, that is, lowered downward out of the way.

On the other hand, when the automatic opening mechanism 3 is not operated, the wall member 44 is in the protruding state, that is, in the raised position. For example, in a case where the carriage 15 is moved in order to detect the position of the carriage 15, the position detection is performed by bringing the carriage 15 into contact with the wall member 44. In this case, since the carriage 15 touches the wall member 44 but does not touch the power receiving section 17 of the lever 11, it is possible to reduce the possibility of the automatic opening mechanism 3 being unintentionally operated.

The wall member 44 can be projected and retracted using a power source such as a motor included in the printing device 1. Reference numeral 65 denotes a print head.

Movement Range of Carriage Controlled According to Current Value

Figure 11:
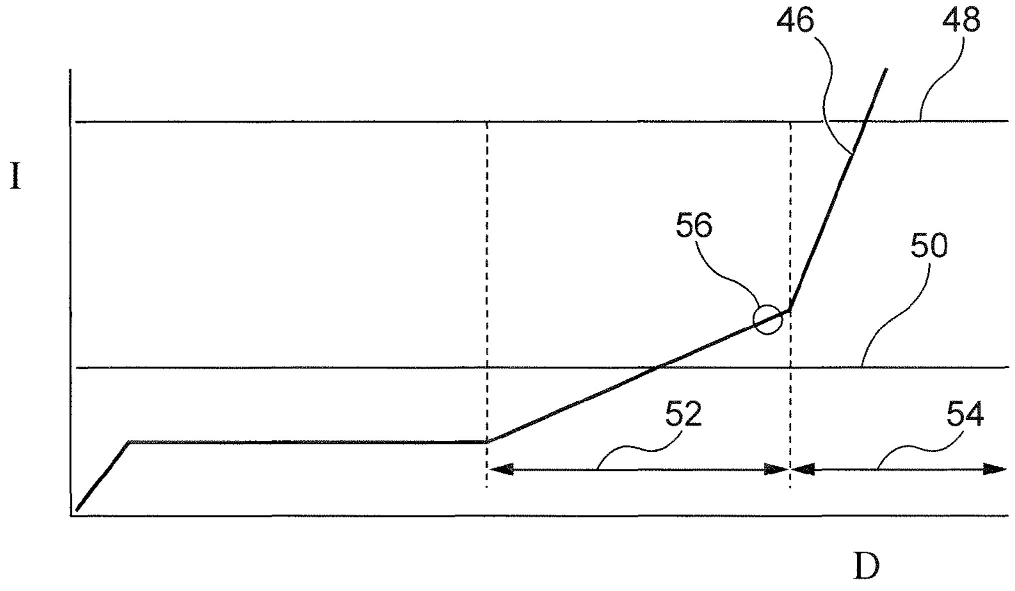
FIG. 11 is a graph showing a threshold value of a current value for controlling a movement range of a carriage in the first embodiment.

FIG. 11 is a graph showing a threshold value of a current value for controlling the movement range of the carriage 15. The horizontal axis represents a movement distance D of the carriage 15 from the origin, and the vertical axis represents the current value I flowing to the carriage 15.

When the carriage 15 starts to move from the origin and comes into contact with the power receiving section 17 of the lever 11 of the automatic opening mechanism 3, the carriage 15 moves against the spring force of the helical torsion spring 38, so that the current value I flowing through the carriage 15 starts to increase. Reference numeral 46 in the drawing indicates a change in the current value I flowing through the carriage 15 at that time.

Reference numeral 56 denotes a position of the carriage 15 at which the maintenance of the closed state of the openable cover 5 is released, that is, a position at which the locking section 13 of the lever 11 is disengaged from the locked section 18 and the openable cover 5 starts to shift to the open state. Reference numeral 50 denotes a first threshold value, and reference numeral 48 denotes a second threshold value. A first threshold value 50 is set in a region 52 from a position where the carriage 15 comes into contact with the power receiving section 17 of the lever 11 to a position 56 where the openable cover 5 starts to open, and a second threshold value 48 is set in a region 54 after the openable cover 5 starts to open.

As can be understood from FIG. 11, the region 52 is a region in which the carriage 15 is in contact with the power receiving section 17 of the lever 11 in a portion closer to the origin before the position 56, but the rotation amount of the lever 11 is still small, and the openable cover 5 is maintained in the closed state. The first threshold value 50 set in the region 52 can be used to detect the position of the carriage 15 without causing the automatic opening mechanism 3 to operate. In FIG. 10, detection of the position of the carriage 15 is performed by bringing the carriage 15 into contact with the wall member 44, but in FIG. 11, detection is performed by detecting the first threshold value 50.

On the other hand, since the openable cover 5 starts to open in the region 54, the second threshold value 48 set in the region 54 can be used to detect the open state of the openable cover 5.

Operation of Openable Cover Automatic Opening Mechanism

In a state shown in FIG. 1 where the openable cover 5 is closed, first, the carriage 15 moves in the −X direction, comes into contact with and further pushes the power receiving section 17 on the slide section 19*a* of the lever 11. The lever 11 receives the power of the movement of the carriage in the −X direction, and rotates around the rotation fulcrum 9. By this rotation of the lever 11, the locking section 13 of the lever 11 is disengaged from the locked section 18 of the openable cover 5. Thereafter, the openable cover 5 opens under by its own weight to reach the state shown in FIG. 2. In FIG. 2, the discharge tray 7 is further pulled out.

Description of Effects of the Embodiment (1) According to the automatic opening mechanism 3 of the present embodiment, the lever 11 rotates when the carriage 15 comes into contact with and presses the power receiving section 17, and rotation of the lever 11 releases maintenance of the closed state of the openable cover 5 by the locking section 13. By this release, the openable cover 5 receives the force F in the opening direction, so the openable cover 5 is shifted from the closed state to the open state by the action of the force F. Therefore, since using the power of the carriage 15 makes it unnecessary to add new power, it is possible to realize cost reduction and space saving of the mechanism for automatically opening the openable cover 5.

(2) According to the present embodiment, since the openable cover 5 has a self weight moment toward the opening side, when the locked state by the locking section 13 is released, the openable cover 5 shifts from the closed state to the open state by the self weight. Thus, it is not necessary to provide a mechanism for performing the opening operation of the openable cover 5, and cost reduction can be realized.

(3) Further, according to the present embodiment, the sensor 25 is provided for detecting the opened state and the closed state of the openable cover 5. As a result, it is possible to eliminate an unnecessary movement such as operating the automatic opening mechanism 3 in a state where the openable cover 5 is already opened, thereby improving usability.

(4) According to the embodiment, the power receiving section 17 of the lever 11 is the slide section 19 (19*a*, 19*b*), which slides by being pushed by the carriage 15. By this, since the lever 11 receives the power of the carriage 15 in such a manner that the slide section 19 slides, the power of the carriage 15 can be effectively utilized.

(5) According to the embodiment, when the slide section 19*a* is pushed by the carriage 15, the contacting protrusion 21 of the slide section 19*a* enters the contacting recess 23 of the carriage 15. By this, the slide section 19*a* easily moves integrally with the carriage 15, and it is possible to reduce a concern that the slide section 19*a* is caught in the carriage 15.

(6) According to the printing device 1 of the embodiment, the printing head 65 mounted on the carriage 15 and the openable cover 5 receiving the force F in the opening direction are provided, and the openable cover automatic opening mechanism 3 having the configuration described above is provided. Accordingly, it is possible to obtain the respective effects of the automatic opening mechanism 3 described above as the printing device 1.

(7) According to the embodiment, the carriage 15 reciprocally moves when printing is performed, and the automatic opening mechanism 3 is positioned outside the range W of the reciprocation of the carriage 15. As described above, the automatic opening mechanism 3 exists independently of the normal printing operation of the printing device 1. That is, it is possible to provide the automatic opening mechanism 3 in the printing device 1 without influencing the structure for executing the printing operation, and it is possible to easily make models with and without the automatic opening mechanism 3.

(8) According to the present embodiment, by opening the openable cover 5, the discharge tray 7 or the like for receiving the printing medium P can be operated. Accordingly, it is possible to reduce the risk of occurrence of damage, failure, or the like due to unintentional contact with the discharge tray 7 or the like that receives the printing medium P.

(9) According to the present embodiment, when the closed state of the openable cover 5 is detected during a printing operation, the printing operation may be stopped, and an operation of releasing the closed state of the openable cover 5 is performed. Thus, even when the openable cover 5 is closed during the printing operation, the openable cover 5 can be opened after the printing operation is stopped, and the printing operation can be resumed.

(10) According to the present embodiment, the operation of releasing maintenance of the closed state of the openable cover 5 is after the main switch of the printing device 1 is turned on and before a printing operation is started. Accordingly, since the operation of releasing the maintenance of the closed state of the openable cover 5 is executed at an appropriate timing, it is possible to not have the openable cover 5 open unintentionally.

Second Embodiment

Next, a printing device according to a second embodiment will be described with reference to FIGS. 12 to 15. The same parts as those in the first embodiment are denoted by the same reference numerals and the description thereof will be omitted.

Figure 12:
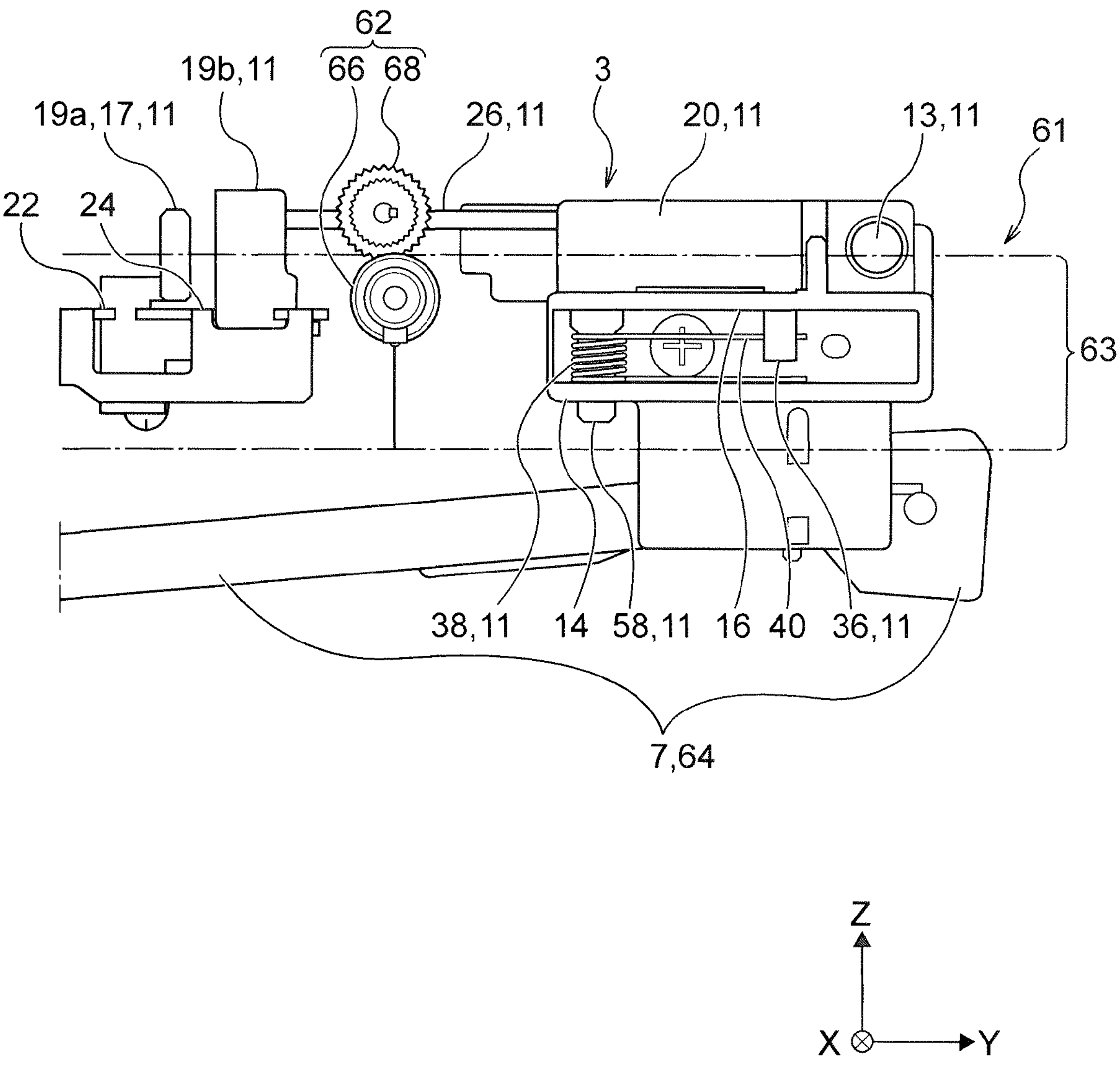
FIG. 12 is a side view of main sections of a printing device according to a second embodiment.

As illustrated in FIGS. 2 and 12, the printing device 1 according to the embodiment includes the print head 65 that performs printing on a medium P, a carriage 15 that moves in a direction intersecting with a transport direction of the medium P, and an openable cover automatic opening mechanism 3. The automatic opening mechanism 3 includes a lever 11 that rotates by receiving the power of the carriage 15 and releases the maintenance of the closed state of the openable cover 5. Since the specific structure of the automatic opening mechanism 3 in this embodiment is the same as that in the first embodiment, the same reference numerals are given to the same parts, and the description thereof will be omitted. It is needless to say that the specific structure of the automatic opening mechanism 3 is not limited to the above structure.

In the present embodiment, there is provided a discharge section 61 that is exposed in a state in which the openable cover 5 is opened and that discharges a medium, that is, the printing medium P. The discharge section 61 discharges the printing medium P out of the printing device 1 (in the +Y direction). The automatic opening mechanism 3 is disposed so as to overlap in the height direction with a discharge region 63 of the discharge section 61.

Here, as shown in FIG. 12, the "discharge region 63 of the discharge section 51" means a region between a discharge roller 62 that sends the printing medium P out of the printing device 1 and a receiving section 64 that is positioned below the discharge roller 62 and receives the discharged printing medium P. The discharge roller 62 is composed of a pair of a drive roller 66 and a driven roller 68, nips the printing medium P with the pair of the drive roller 66 and the driven roller 68, and applies a feeding force in a discharge direction (+Y direction). In the present embodiment, the receiving section 64 is provided inside the openable cover 5 so as to be able to be drawn out, and includes the discharge tray 7 that receives the printing medium P discharged in a state in which the discharge tray 7 is drawn out. As shown in FIG. 2, the discharge tray 7 in the pulled-out state is positioned above the openable cover 5 in the open state.

FIG. 12 shows a state in which the receiving section 64 is housed in the printing device 1 before being drawn out, and FIG. 2 shows a state in which the receiving section 64 is drawn out.

In addition, "overlap" in "disposed so as to overlap in the height direction with the discharge region 63 of the discharge section 61" is used to mean that a region occupied by a member constituting the automatic opening mechanism 3 may at least partially overlap with the discharge region 63 in the height direction (Z-axis direction).

In this embodiment, the members constituting the automatic opening mechanism 3 are constituted by the locking section body 20 having the locking section 13 and the protrusion 36 constituting the lever 11, the slide section 19 (19*a*, 19*b*) having the power receiving section 17, the rotation fulcrum shaft 58 having the helical torsion spring 38, and the power transmission shaft 26.

Figure 13:
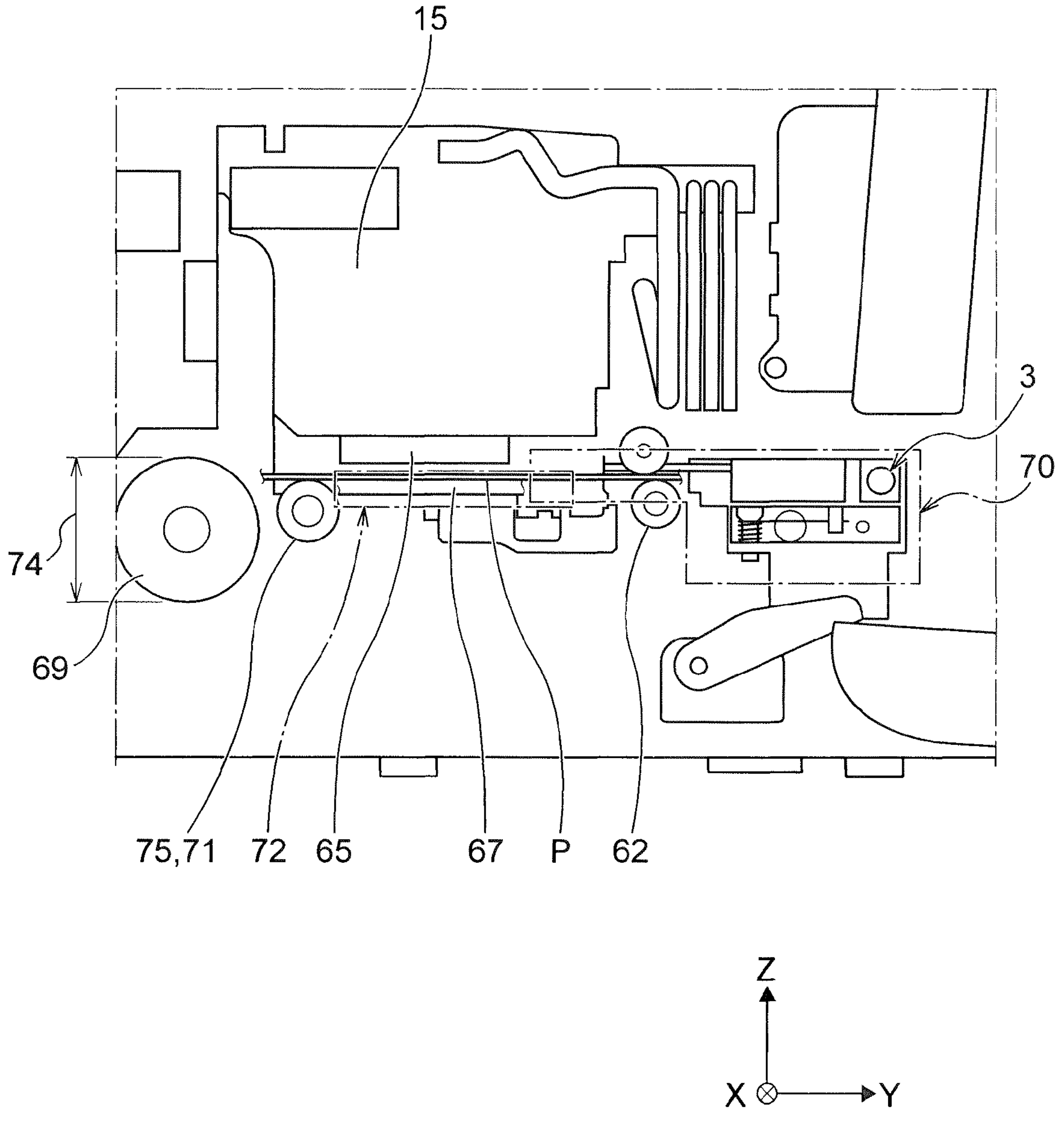
FIG. 13 is a side view of main sections of a printing device according to a second embodiment.

Also, as shown in FIG. 13, in the present embodiment, the automatic opening mechanism 3 is disposed so as to overlap in the height direction with a platen 67, which is a medium supporting member positioned facing the print head 65. In FIG. 13, the region occupied by the members constituting the automatic opening mechanism 3 is surrounded by a frame 70 for ease of understanding.

The print head 65 is mounted on the carriage 15. The platen 67 supports a printing medium (not shown) from below when the printing medium transported along a transport path passes through a printing region of the print head 65.

Further, in the present embodiment, the automatic opening mechanism 3 is disposed so as to overlap in the height direction with a motor 69 that drives a transporting roller 75. In FIG. 13, reference numeral 74 denotes a region occupied by the motor 69 in the height direction.

In FIG. 13, a region occupied by a member constituting a platen is surrounded by a frame 72 for easy understanding.

A gear train for transmitting the power of the motor 69 as the driving source to the transporting roller 75 will be described later.

Figure 14:
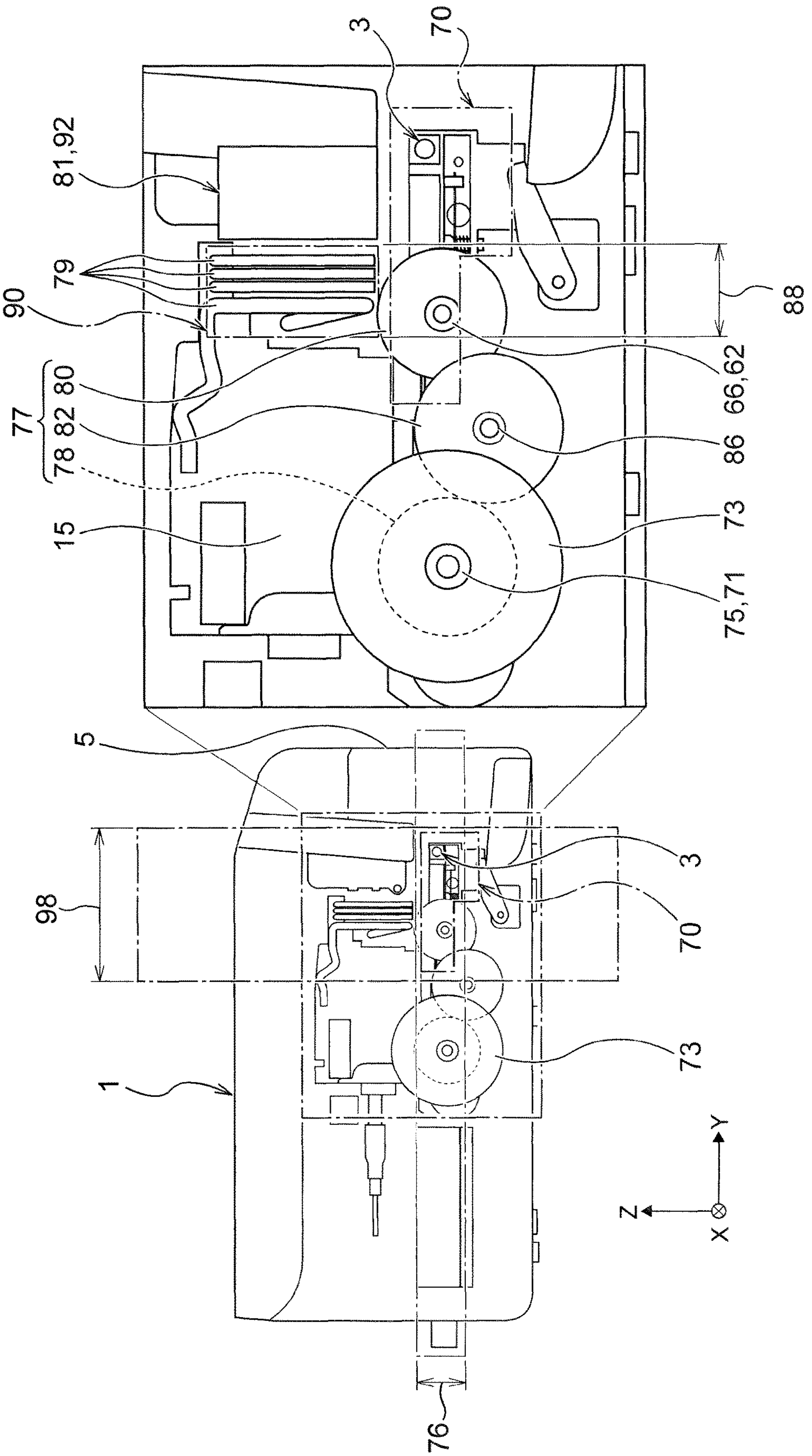
FIG. 14 is a partially enlarged side view of main sections of a printing device according to a second embodiment.

As shown in FIG. 14, a part of which is shown in an enlarged view, in the present embodiment, the automatic opening mechanism 3 is disposed so as to overlap in the height direction with a disc scale 73 provided on a shaft 71 of the transporting roller 75 for transporting the printing medium P in the transporting direction (+Y direction). Reference numeral 76 indicates a region where the automatic opening mechanism 3 and the disc scale 73 overlap.

The disc scale 73 is used to detect a transport amount of the printing medium P by the transporting roller 75, and is formed in a known structure in which a slit pattern is applied to a peripheral edge portion.

Further, as shown in FIG. 14, in this embodiment, the automatic opening mechanism 3 is disposed so as to overlap in the height direction with a gear train 77 which is a power transmission mechanism for transmitting the power of the motor 69. In the present embodiment, the gear train 77 includes a transporting gear 78 attached to the shaft 71 of the transporting roller 75, a discharging gear 80 attached to the shaft 84 of the discharge roller 62, and a connecting gear 82 that connects both gears 78, 80. Reference numeral 86 denotes a shaft of the connecting gear 82.

The reference numeral 76 also indicates a region in which the automatic opening mechanism 3 and the gear train 77 overlap.

As shown in FIG. 14, in the present embodiment, the automatic opening mechanism 3 is disposed so as to overlap in the depth direction (Y-axis direction) with ink supply tubes 79 that supply ink to the print head 65. The ink supply tubes 79 are ink tubes of four colors of cyan, magenta, yellow, and black in this embodiment.

In FIG. 14, a region occupied in the depth direction of the ink supply tubes 79 is surrounded by a frame 90 for easy understanding. Reference numeral 88 denotes a region where the automatic opening mechanism 3 and the ink supply tubes 79 overlap.

Further, as shown in FIG. 14, in the present embodiment, the automatic opening mechanism 3 is disposed so as to overlap in the depth direction with a screen hinge 81 for the scanner unit 4 formed in the upper portion of the printing device 1. The screen hinge 81 is used to open the scanner unit 4 and has a known structure.

Here, in order to explain the overlap in the depth direction, the illustration is simplified, and the screen hinge 81 is illustrated by a square frame 92. Reference numeral 98 denotes a region where the automatic opening mechanism 3 and the screen hinge 81 overlap.

Figure 15:
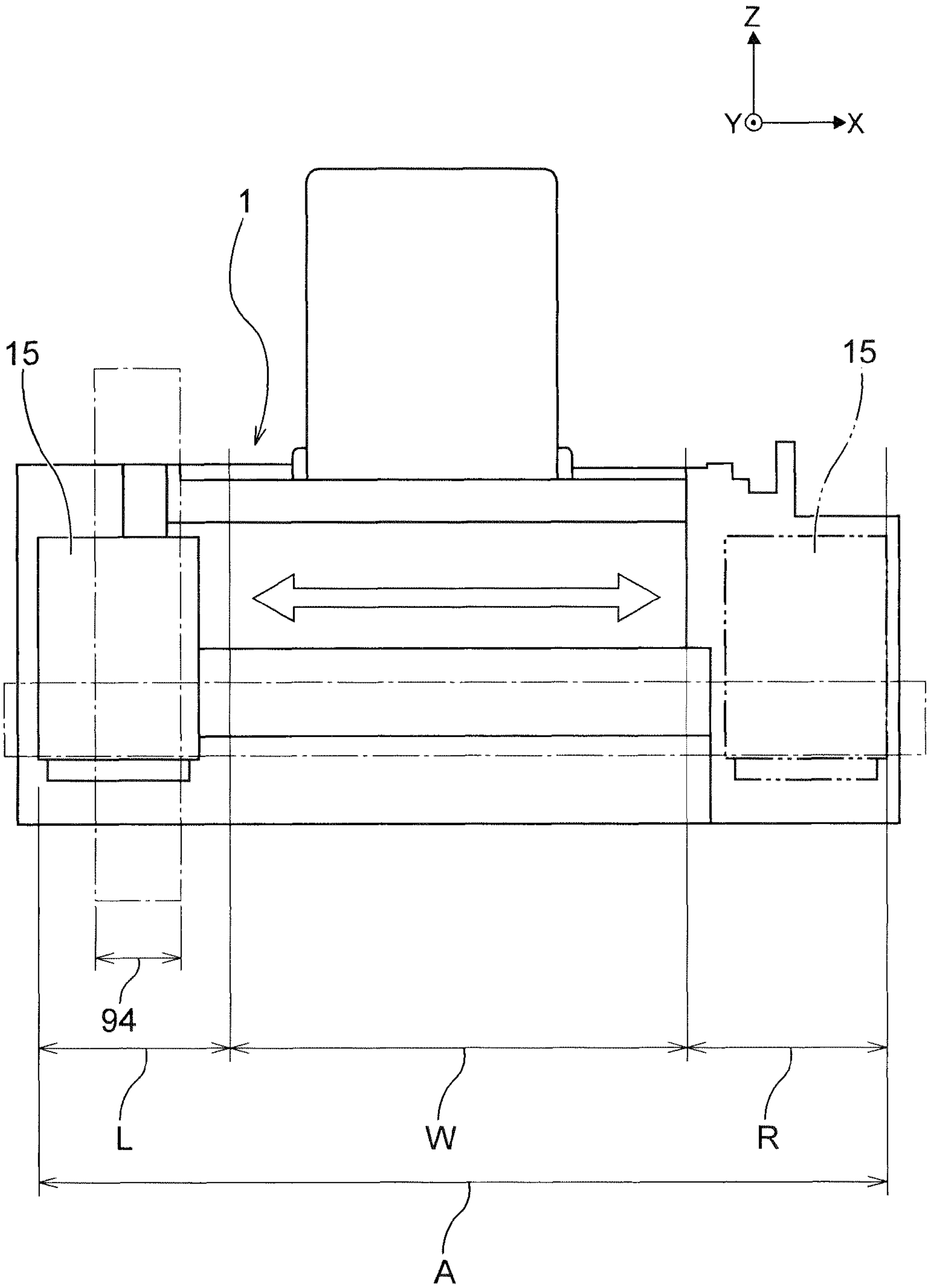
FIG. 15 is a schematic plan view of main sections of a printing device according to a second embodiment.

Further, as shown in FIG. 15, in the present embodiment, the automatic opening mechanism 3 is disposed so as to overlap the operating range of the carriage 15 in the moving direction of the carriage. The carriage motion range A includes a carriage reciprocation range W when printing is performed, and further includes a movement range R in the +X direction and a movement range L in the −X direction of the range W.

Reference numeral 94 indicates a region where the automatic opening mechanism 3 and the carriage motion range A overlap.

Description of Effects of the Embodiment (1) According to the printing device 1 of the present embodiment, the openable cover automatic opening mechanism 3 includes the lever 11 that rotates by receiving the power of the carriage 15 and releases the maintenance of the closed state of the openable cover 5, the discharge section 61 of the printing medium P that is exposed when the openable cover 5 is opened, and the automatic opening mechanism 3 is disposed so as to overlap the discharge region 63 of the discharge section 61 in the height direction. Accordingly, an increase in the size of the printing device 1 in the height direction can be suppressed.

(2) In addition, according to the present embodiment, the discharge tray 7 is provided to the inside of the openable cover 5 so as to be able to be pulled out, and receives the printing medium P discharged in a state of being pulled out. That is, in the printing device 1 including the discharge tray 7 that receives the printing medium P, it is possible to obtain the same effect as the above (1) by using the discharge tray 7 as the receiving section 64 of the printing medium P.

(3) According to the present embodiment, the automatic opening mechanism 3 is disposed so as to overlap in the height direction with the platen 67 positioned to face the print head 65. Accordingly, an increase in the size of the printing device 1 in the height direction can be suppressed.

(4) Further, according to the present embodiment, the automatic opening mechanism 3 is disposed so as to overlap, in the height direction, the disc scale 73 provided on the shaft of the transporting roller 75 that transports the printing medium P in the transport direction. Accordingly, an increase in the size of the printing device 1 in the height direction can be suppressed.

(5) According to the present embodiment, the automatic opening mechanism 3 is disposed so as to overlap, in the height direction, with the motor 69, which is the driving source of the transporting roller 75. Accordingly, an increase in the size of the printing device 1 in the height direction can be suppressed.

(6) In addition, according to the present embodiment, the automatic opening mechanism 3 is disposed so as to overlap in the height direction with the gear train 77 that transmits the power of the motor 69. Accordingly, an increase in the size of the printing device 1 in the height direction can be suppressed.

(7) According to the present embodiment, the automatic opening mechanism 3 is disposed so as to overlap with the ink supply tubes 79 in the depth direction. Accordingly, an increase in the size of the printing device 1 in the depth direction can be suppressed.

(8) According to the embodiment, the automatic opening mechanism 3 is disposed so as to overlap in the depth direction with the screen hinge 81 for the scanner unit 4 included in the printing device 1. Accordingly, an increase in the size of the printing device 1 in the depth direction can be suppressed.

(9) According to the present embodiment, the automatic opening mechanism 3 is disposed so as to overlap the motion range A of carriage 15 in the moving direction of the carriage 15. Accordingly, an increase in the size of the printing device 1 in the movement direction of the carriage 15 can be suppressed.

Third Embodiment

Next, a printing device according to a third embodiment will be described with reference to FIGS. 16 to 21. The same parts as those in the first and second embodiments are denoted by the same reference numerals and the description thereof will be omitted.

Figure 16:
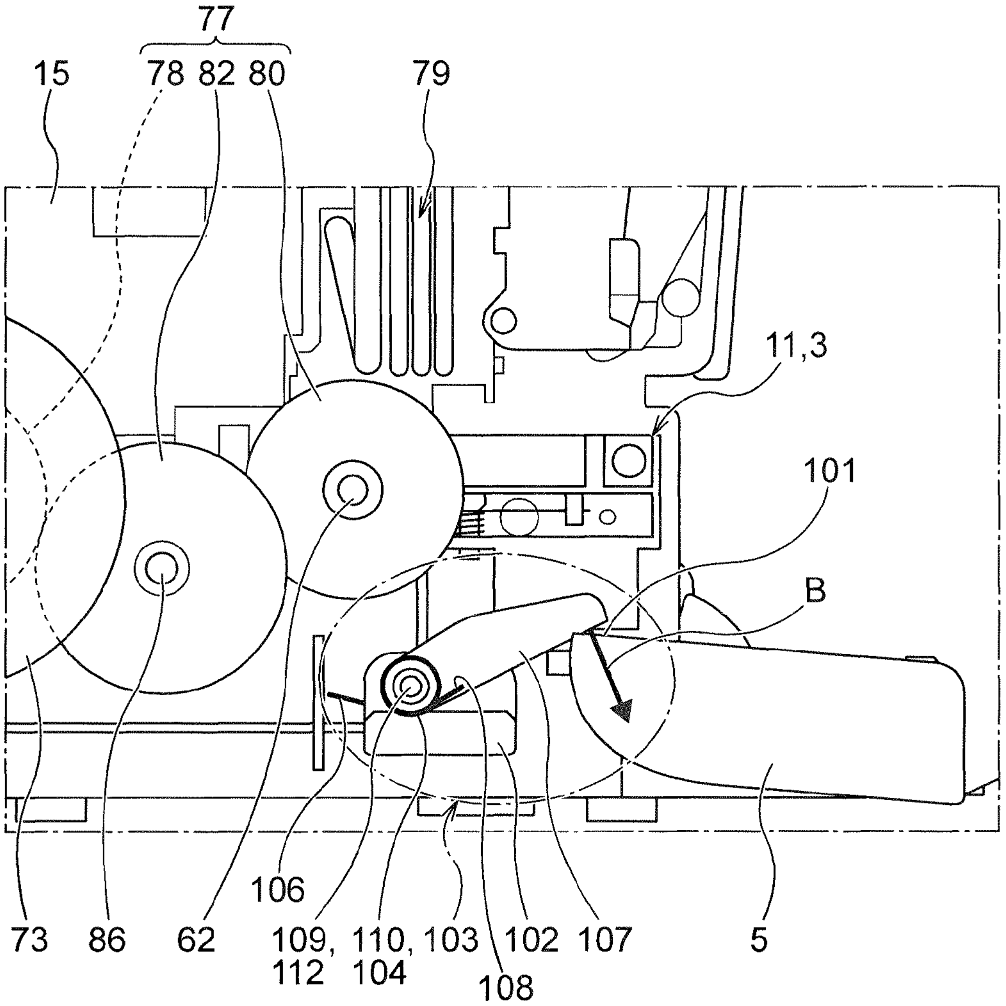
FIG. 16 is a side view of main sections of a printing device according to a third embodiment.
Figure 17:
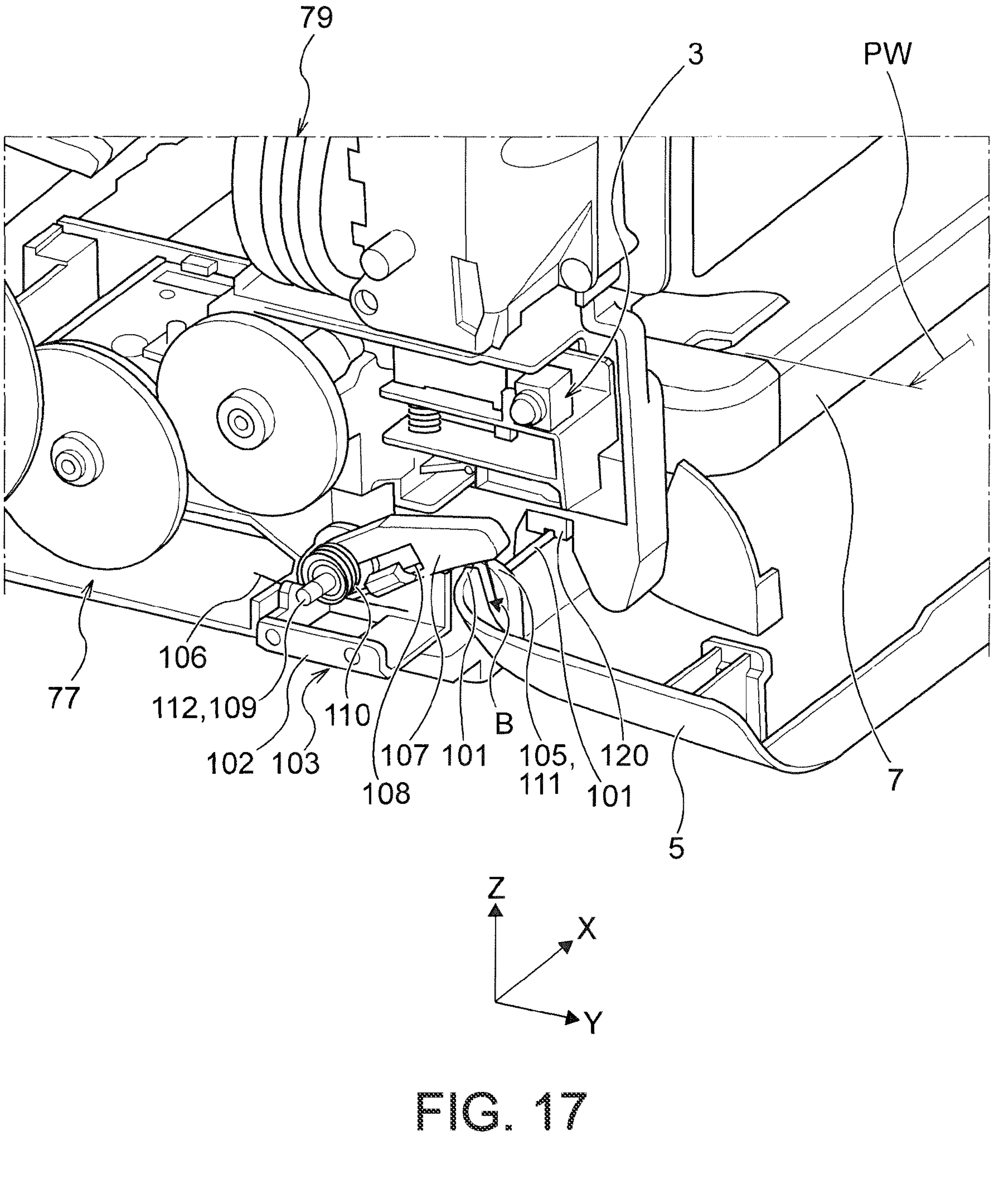
FIG. 17 is a perspective view of main sections of a printing device according to a third embodiment.
Figure 18:
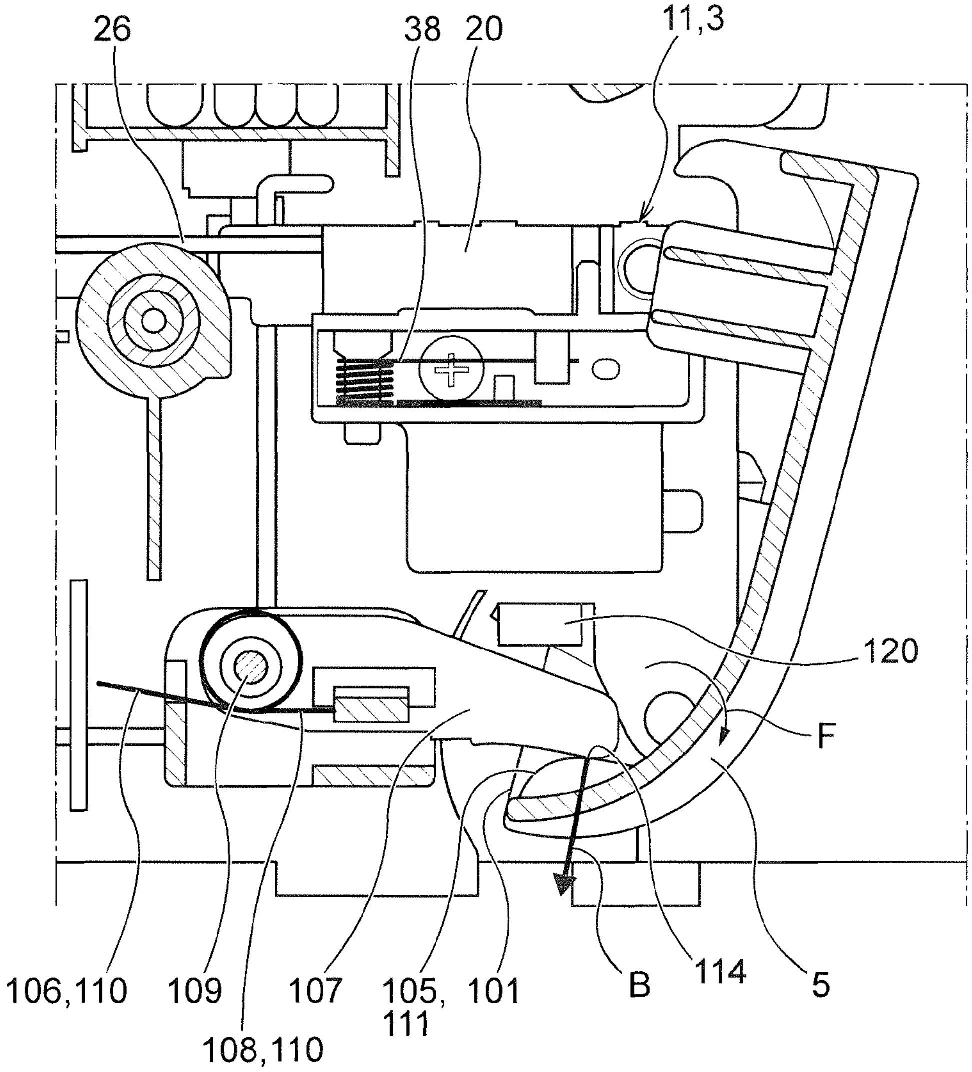
FIG. 18 is a side cross-sectional view of main sections of a printing device according to the third embodiment.

As shown in FIGS. 16 to 18, in the printing device 1 according to the present embodiment, the openable cover 5 receives the force F in the opening direction, and includes the openable cover automatic opening mechanism 3. The automatic opening mechanism 3 includes a lever 11 that rotates by receiving the power of the carriage 15 and releases the maintenance of the closed state of the openable cover 5. The printing device 1 includes the print head 65 that performs printing on medium P, and includes a carriage 15 that moves in a direction intersecting the transport direction of medium P.

Since the specific structure of the automatic opening mechanism 3 is the same as that of the first embodiment, the same reference numerals are given to the same portions, and the description thereof will be omitted. The specific structure of the automatic opening mechanism 3 may be any structure in which the lever 11 is rotated by receiving the power of the carriage 15 to release the closed state of the openable cover 5, and is not limited to the above-described structure.

In the present embodiment, there is provided a braking mechanism 103 that brakes opening of the openable cover 5 by coming into contact with a proximal end 101 of the openable cover 5 that is released from the maintenance of the closed state by the automatic opening mechanism 3 and moves in the opening direction.

In the present embodiment, the braking mechanism 103 includes a brake lever 107 that comes into contact with a contacted portion 105 located at the proximal end 101 of the openable cover 5 to apply a braking force B, a pivot fulcrum 109 that pivotably supports the proximal end of the brake lever 107, and a spring member 110 that generates the braking force B.

Reference numeral 102 denotes a holder to which the brake lever 107 is assembled. The brake lever 107 is rotatably mounted to a shaft 112 fixed to a holder 102. The shaft 112 forms the pivot fulcrum 109. The holder 102 is mounted to a housing 116 (FIG. 21) of the printing device 1.

The spring member 110 is formed of a helical torsion spring 104. One end 106 of the helical torsion spring 104 is locked in a locked section of the holder 102, and the other end 108 thereof is locked in a locked section of the brake lever 107, thereby generating the braking force B with respect to the openable cover 5.

In the present embodiment, a portion of the contacted portion 105 that is brought into contact with the brake lever 107 is a cam surface 111. The cam surface 111 has a convex curved surface shape, so that a contact point 114 with the brake lever 107 moves while smoothly contacting the convex curved surface as the opening angle of the openable cover 5 increases.

The braking force B of the braking mechanism 103 is set smaller than the force F in the opening direction with respect to the openable cover 5. That is, even if the braking force B acts on the openable cover 5, the openable cover 5 does not stop in the process of opening.

The relationship among the force F in the opening direction of the openable cover 5, the braking force B of the brake lever 107, and the shape of the cam surface 111 is configured such that a difference MD between an opening direction moment MO by the force F in the opening direction of the openable cover 5 and a closing direction moment MC by the braking force B of the brake lever 107 is within a constant range.

Figure 19:
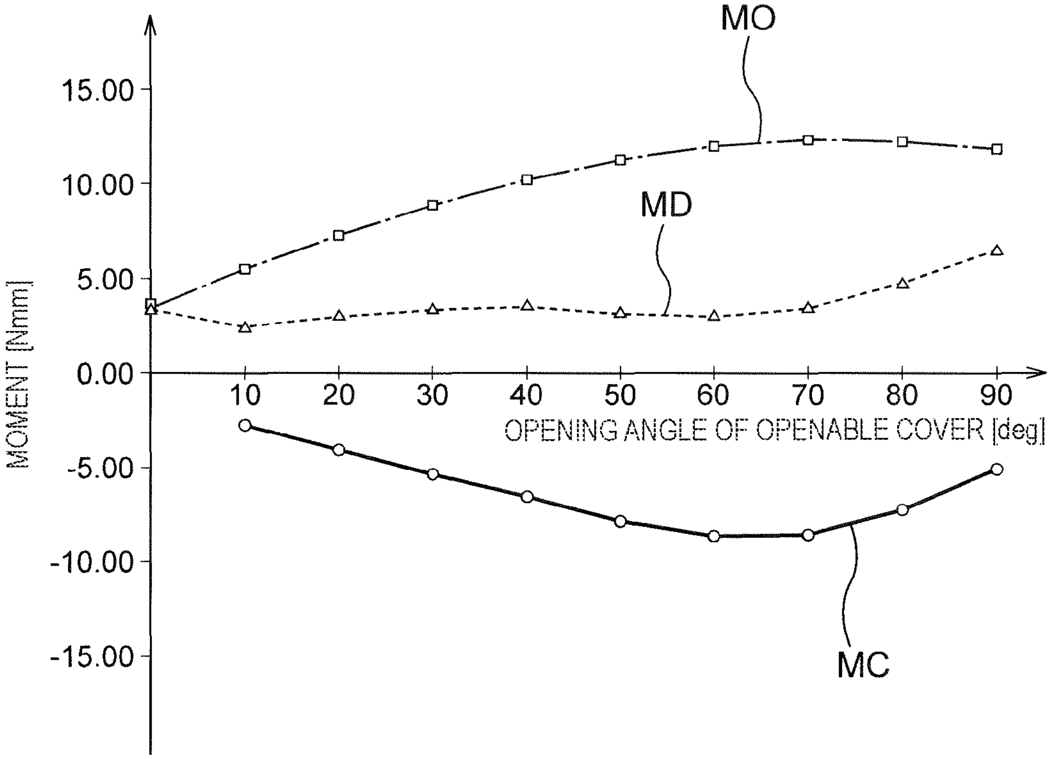
FIG. 19 is a graph showing a relationship between an opening angle of the openable cover and a moment related to the openable cover.

With reference to FIG. 19, the relationship among the force F, the braking force B, and the shape of the cam surface 111 will be specifically described. FIG. 19 shows a graph which shows a relationship between an opening angle (horizontal axis) of the openable cover 5 and a moment (vertical axis) related to the openable cover 5. The moment in the direction in which the openable cover 5 opens is positive. As shown in the figure, the opening direction moment MO changes in the positive region with respect to the opening angle of the openable cover 5. On the other hand, the closing direction moment MC changes in the negative region with respect to the opening angle of the openable cover 5. The above relationship is formed so that the difference MD between the opening direction moment MO and the closing direction moment MC becomes substantially constant in a positive region with respect to the opening angle of the openable cover 5.

Figure 20:
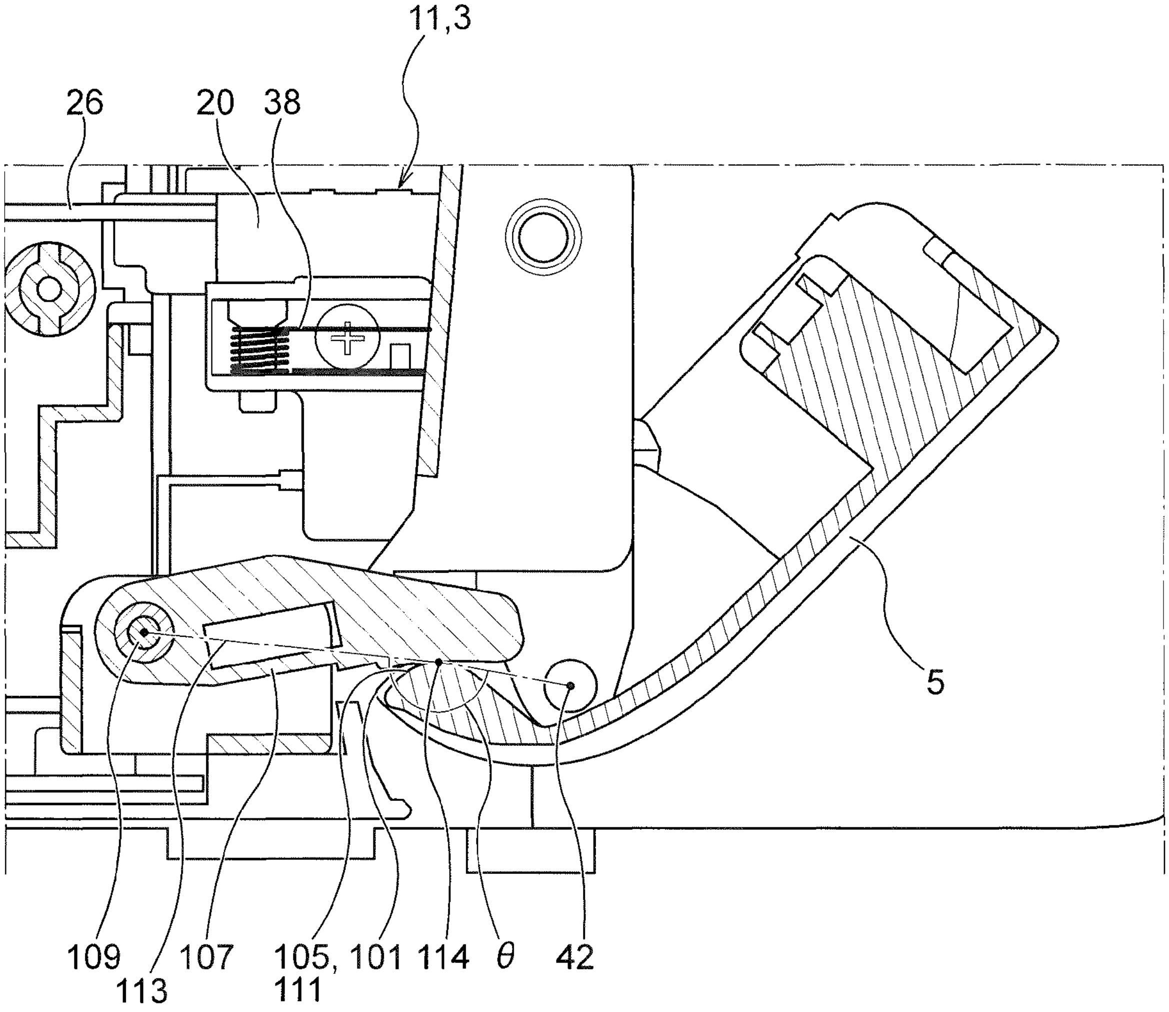
FIG. 20 is a sectional side view of main sections of a printing device according to a third embodiment.

Further, in the present embodiment, as shown in FIG. 20, the cam surface 111 has a shape in which an angle θ formed by a first line segment 113 and a second line segment 115 is an obtuse angle, wherein the first line segment 113 connects the contact point 114 with the brake lever 107 and the pivot fulcrum 109 of the brake lever 107 and the second line segment 115 connects the contact point 114 with the brake lever 107 and the opening and closing movement fulcrum 42 of the openable cover 5. By setting this angle θ to an obtuse angle, a moment in the closing direction is always generated with respect to the openable cover 5.

Further, in the present embodiment, similarly to the first embodiment, the sensor 25 that detects the opened state and the closed state of the openable cover 5 is provided. Since the specific structure and detection method of the sensor 25 are the same as those described with reference to FIGS. 9A and 9B in the first embodiment, the description thereof will be omitted here.

In this embodiment, as shown in FIG. 18, the pivot fulcrum 109 of the brake lever 107 is located below the gear train 77 which is a power transmission mechanism for transmitting the power of the motor 69 (FIG. 13). That is, it is arranged so as not to overlap with the gear train 77 located near.

Further, the pivot fulcrum 109 of the brake lever 107 is disposed so as to overlap the gear train 77 in the depth direction (Y-axis direction) of the printing device 1 in a state of being positioned below the gear train 77. Here, the pivot fulcrum 109 is positioned below the discharging gear 80 of the gear train 77 and overlaps with the discharging gear 80 in the depth direction.

Further, in this embodiment, the pivot fulcrum 109 is disposed so as to overlap the gear train 77 in the height direction (Z-axis direction) of the printing device 1.

In addition, in the embodiment, as illustrated in FIG. 17, the braking mechanism 103 is positioned (−X direction) outside in the width direction (X axis direction) intersecting the transport direction (+Y direction) of the transportation path PW of the printing medium P.

Figure 21:
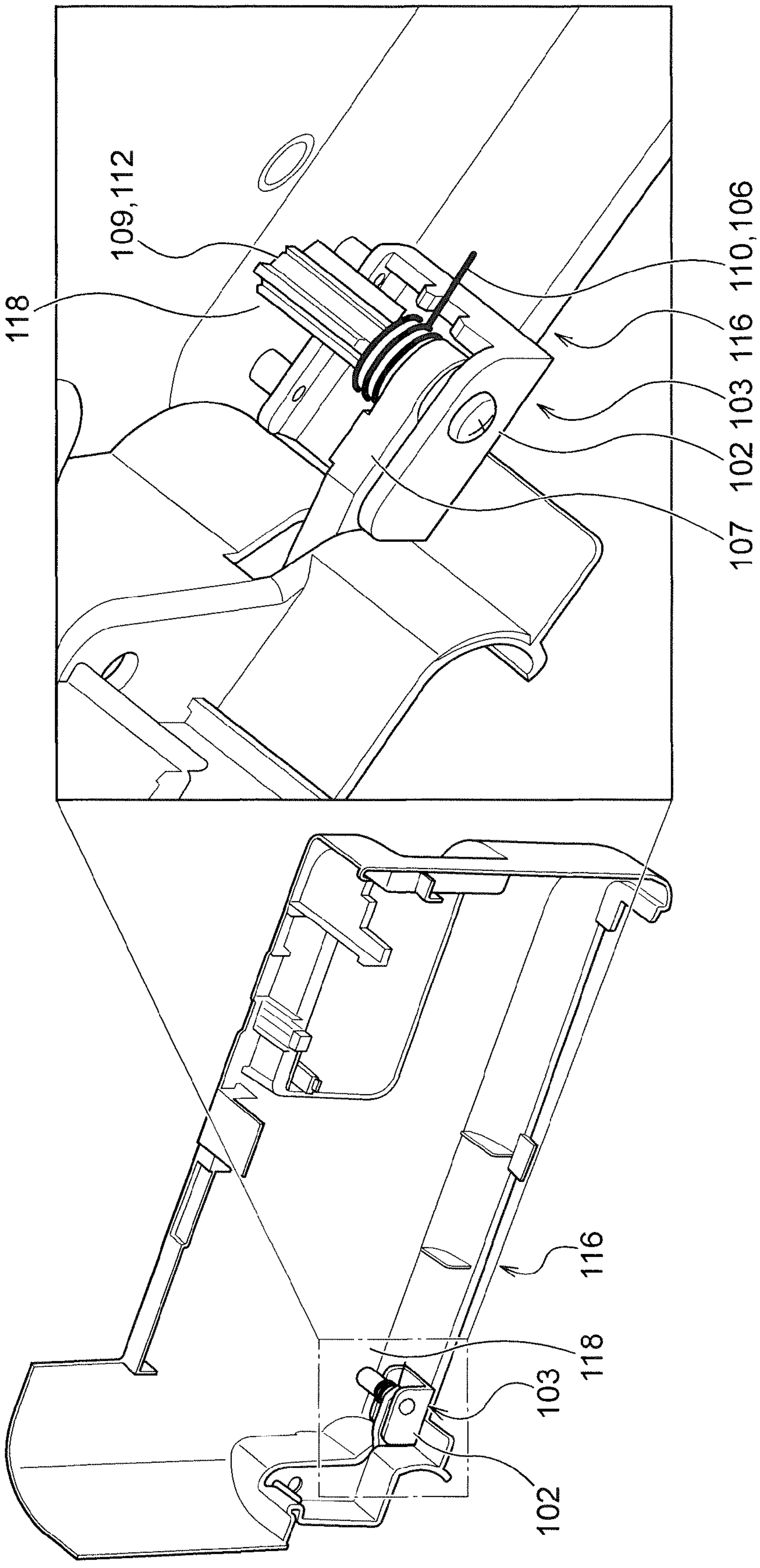
FIG. 21 is a partially enlarged perspective view of a portion to which a holder of the printing device according to the third embodiment is attached.

More specifically, as shown in FIG. 21, the holder 102 to which the brake lever 107 is assembled is mounted on the housing 116 of the printing device 1. That is, the holder 102 is mounted on a portion 118 of the housing 116 located outside the automatic opening mechanism 3.

In the present embodiment, as shown in FIG. 17, the braking mechanism 103 is disposed so as to overlap in the depth direction (Y-axis direction) with the ink supply tubes 79 that supply ink to the print head 65. The ink supply tubes 79 are ink tubes of four colors of cyan, magenta, yellow, and black in this embodiment.

Braking of Openable Cover by Braking Mechanism

When an operation command for releasing the maintenance of the closed state of the openable cover 5 is issued to the automatic opening mechanism 3 in a state where the openable cover 5 is closed (FIG. 1), the locking section 13 is retracted from the locked section 18 as described above, and the openable cover 5 starts to open by itself by the force F. In the present embodiment, as shown in FIG. 18, when the opening angle of the openable cover 5 becomes about 10 degrees, the brake lever 107 is brought into contact with the contacted portion 105 of the proximal end 101 of the openable cover 5. When the opening angle of the openable cover 5 is about 10 degrees or less, the brake lever 107 is not in contact with the contacted portion 105 of the openable cover 5.

When the brake lever 107 comes into contact with the contacted portion 105 of the openable cover 5 that is being opened, the braking force B acts on the openable cover 5. Thereafter, the contact point 114 between the cam surface 111 and the brake lever 107 moves while making smooth contact on the convex curved surface as the opening angle of the openable cover 5 increases. At this time, due to an action of the difference MD between the opening direction moment MO and the closing direction moment MC illustrated in FIG. 19, the openable cover 5 gently opens in a state in which rapid opening due to the force F is suppressed. Then, a part of the proximal end 101 of the openable cover 5 is accommodated in a sponge-like receiving portion 120, so that it lands softly with little impact, and the state shown in FIGS. 16 and 17 is obtained.

Description of Effects of the Embodiment (1) According to the printing device 1 of the present embodiment, the braking mechanism 103 is provided that brakes opening movement of the openable cover 5 by coming into contact with the proximal end 101 of the openable cover 5 that is released from the closed state by the automatic opening mechanism 3 and that moves in the opening direction. Thus, the openable cover 5 can be opened automatically by utilizing the power of the carriage 15. Further, when the openable cover 5 is opened, the braking mechanism 103 brakes the movement of the openable cover 5 during opening. Therefore, it is possible to realize with a simple structure a gentle opening by suppressing a rapid opening of the openable cover 5.

(2) According to the present embodiment, the braking mechanism 103 includes the brake lever 107 that comes into contact with the contacted portion 105 located at the proximal end 101 of the openable cover 5 to apply the braking force B, the pivot fulcrum 109 that pivotably supports the proximal end of the brake lever 107, and the spring member 110 that generates the braking force B. Accordingly, the braking mechanism 103 that achieves the gentle opening can be achieved with a simple structure.

(3) According to the present embodiment, the braking force B of the braking mechanism 103 is set to be smaller than the force F in the opening direction with respect to the openable cover 5. Thus, even if the braking force B acts on the openable cover 5, the risk of the openable cover 5 stopping in the process of opening can be reduced.

(4) According to the present embodiment, the contacted portion 105 that comes into contact with the brake lever 107 is the cam surface 111, and the cam surface 111 has a shape in which the difference MD between the opening direction moment MO due to the force F in the opening direction of the openable cover 5 that opens in the opening direction and the closing direction moment MC due to the braking force B of the brake lever 107 falls within a constant range. This makes it possible to make the speed at which the openable cover 5 opens substantially constant.

Further, by setting the difference MD between the opening direction moment MO and the closing direction moment MC to a small value, it becomes possible to open at a slow and substantially constant speed.

(5) According to the embodiment, the cam surface 111 has a shape in which the angle θ formed by the first line segment 113 connecting the contact point 114 with the brake lever 107 and the pivot fulcrum 109 of the brake lever 107 and the second line segment 115 connecting the contact point 114 with the brake lever 107 and the opening and closing movement fulcrum 42 of the openable cover 5 is an obtuse angle. By setting the angle θ to an obtuse angle, a moment in the closing direction is always generated with respect to the openable cover 5, it is possible to open the openable cover 5 at a slow and substantially constant speed.

(6) Further, according to the present embodiment, the sensor 25 is provided for detecting the opened state and the closed state of the openable cover 5. Accordingly, by setting the state in which the openable cover 5 is sufficiently opened, so that the printing medium P to be discharged will no jam up, to be recognized as "open", it is possible to reduce the occurrence of clogging of the printing medium P.

(7) According to the present embodiment, the pivot fulcrum 109 of the brake lever 107 is positioned below the gear train 77 that transmits the power of the motor 69. As a result, it is arranged so as not to overlap with the gear train 77 positioned nearby, thereby facilitating design and manufacture.

In addition, when the pivot fulcrum 109 of the brake lever 107 is disposed so as to overlap the gear train 77 in the depth direction (Y-axis direction) of the printing device 1 in a state of being positioned below the gear train 77, it is possible to realize miniaturization in the depth direction.

(8) According to the present embodiment, the braking mechanism 103 is located outside of the transportation path PW of the printing medium P in the width direction (X-axis direction). Thus, the braking mechanism 103 can be arranged without affecting the transportation of the printing medium P.

(9) According to the present embodiment, the braking mechanism 103 is disposed so as to overlap the ink supply tube in the depth direction. Accordingly, an increase in the size of the printing device 1 in the depth direction can be suppressed.

OTHER EMBODIMENTS

The openable cover automatic opening mechanism 3 and the printing device 1 according to the present disclosure are based on the configuration of the above-described embodiment, but it is of course possible to change or omit a partial configuration without departing from the gist of the present disclosure.

What is claimed is:

1. A printing device comprising:

an openable cover automatic opening mechanism and a carriage that includes a print head for performing printing on a medium and that moves in a direction intersecting with a transporting direction of the medium, wherein the openable cover automatic opening mechanism includes a first lever that has a locking mechanism and that is configured to release maintenance of a closed state of an openable cover by receiving power of the carriage that releases the locking mechanism by movement of the first lever, and the printing device includes a braking mechanism that is provided for breaking an opening movement of the openable cover, the braking mechanism contacting a proximal end of the openable cover which is opened in an opening direction from the closed state when released by the openable cover automatic opening mechanism, the braking mechanism including a brake lever that is different from the first lever and that contacts a contacted portion located at the proximal end of the openable cover to apply a braking force, the braking mechanism includes a pivot fulcrum configured to pivotably support a proximal end of the brake lever; and a spring member configured to generate the braking force, and the contacted portion that contacts the brake lever is a cam surface, the cam surface has a shape in which a difference between an opening direction moment due to a force in the opening direction of the openable cover that is opening in the opening direction and a closing direction moment due to a braking force of the brake lever is in a constant range.

2. The printing device according to claim 1, wherein the braking force of the braking mechanism is set smaller than a force in an opening direction with respect to the openable cover.

3. The printing device according to claim 1, wherein the cam surface has a shape such that an angle formed by a first line segment connecting a contact point with the brake lever and the pivot fulcrum of the brake lever and a second line segment connecting a contact point with the brake lever and an opening and closing movement fulcrum of the openable cover is an obtuse angle.

4. The printing device according to claim 1, further comprising:

a sensor configured to detect an opened state and a closed state of the openable cover.

5. The printing device according to claim 1, wherein the pivot fulcrum of the brake lever is located below a power transmission mechanism that transmits power of the motor.

6. The printing device according to claim 1, wherein the braking mechanism is located outside of a transport path of a printing medium in a width direction intersecting a transport direction of the printing medium.

7. The printing device according to claim 1, wherein the braking mechanism is disposed so as to overlap in a depth direction with an ink supply tube that supplies ink to the print head.

8. The printing device according to claim 1, wherein the brake lever contacts the contacted portion from above to apply the braking force to the openable cover.

* * * * *